(12) United States Patent
Keesling et al.

(10) Patent No.: US 11,553,165 B2
(45) Date of Patent: Jan. 10, 2023

(54) COLOR NIGHT VISION CAMERAS, SYSTEMS, AND METHODS THEREOF

(71) Applicant: Applied Minds, LLC, Burbank, CA (US)

(72) Inventors: Michael Keesling, Agoura Hills, CA (US); Bran Ferren, Beverly Hills, CA (US); Adrian Kaehler, Los Angeles, CA (US); Dan Ruderman, Glendale, CA (US); David Beal, Glendale, CA (US); Pablo Maurin, Glendale, CA (US); Eric Powers, Glendale, CA (US)

(73) Assignee: Applied Minds, LLC, Burbank, CA (US)

( * ) Notice: Subject to any disclaimer, the term of this patent is extended or adjusted under 35 U.S.C. 154(b) by 30 days.

(21) Appl. No.: 17/063,591

(22) Filed: Oct. 5, 2020

(65) Prior Publication Data
US 2021/0037223 A1    Feb. 4, 2021

Related U.S. Application Data

(63) Continuation of application No. 16/802,210, filed on Feb. 26, 2020, now Pat. No. 10,798,355, which is a
(Continued)

(51) Int. Cl.
*H04N 9/64* (2006.01)
*H04N 13/204* (2018.01)
(Continued)

(52) U.S. Cl.
CPC ............... *H04N 9/64* (2013.01); *G06T 5/20* (2013.01); *H04N 5/2254* (2013.01);
(Continued)

(58) Field of Classification Search
CPC ............ G06T 5/20; G06T 2207/10024; G06T 2207/10048; H04N 5/2254;
(Continued)

(56) References Cited

U.S. PATENT DOCUMENTS 6,597,807 B1    7/2003    Watkins et al.
7,057,647 B1    6/2006    Monroe
(Continued)

OTHER PUBLICATIONS

Buades, Antonio, et al., "A non-local algorithm for image denoising", Proc. IEEE CVPR, vol. 2, Jun. 2005, 60-65.
(Continued)

*Primary Examiner* — Mark R Gaworecki
(74) *Attorney, Agent, or Firm* — Perkins Coie LLP; Michael A. Glenn

(57) ABSTRACT

Disclosed are improved methods, systems and devices for color night vision that reduce the number of intensifiers and/or decrease noise. In some embodiments, color night vision is provided in system in which multiple spectral bands are maintained, filtered separately, and then recombined in a unique three-lens-filtering setup. An illustrative four-camera night vision system is unique in that its first three cameras separately filter different bands using a subtractive Cyan, Magenta and Yellow (CMY) color filtering-process, while its fourth camera is used to sense either additional IR illuminators or a luminance channel to increase brightness. In some embodiments, the color night vision is implemented to distinguish details of an image in low light. The unique application of the three-lens subtractive CMY filtering allows for better photon scavenging and preservation of important color information.

17 Claims, 25 Drawing Sheets
(2 of 25 Drawing Sheet(s) Filed in Color)

Related U.S. Application Data continuation of application No. 16/517,451, filed on Jul. 19, 2019, now Pat. No. 10,582,173, which is a continuation of application No. 15/877,300, filed on Jan. 22, 2018, now Pat. No. 10,362,285, which is a continuation of application No. 15/357,788, filed on Nov. 21, 2016, now Pat. No. 9,894,337, which is a continuation of application No. 14/730,172, filed on Jun. 3, 2015, now Pat. No. 9,503,623.

(60) Provisional application No. 62/007,317, filed on Jun. 3, 2014.

(51) Int. Cl.

| | | |
|---|---|---|
| *H04N 5/20* | (2006.01) | |
| *G06T 5/20* | (2006.01) | |
| *H04N 5/33* | (2006.01) | |
| *H04N 5/225* | (2006.01) | |
| *H04N 5/232* | (2006.01) | |
| *H04N 5/357* | (2011.01) | |
| *H04N 5/372* | (2011.01) | |
| *H04N 13/257* | (2018.01) | |

(52) U.S. Cl.
CPC ..... *H04N 5/23258* (2013.01); *H04N 5/23267* (2013.01); *H04N 5/33* (2013.01); *H04N 5/357* (2013.01); *H04N 5/372* (2013.01); *H04N 13/204* (2018.05); *G06T 2207/10024* (2013.01); *G06T 2207/10048* (2013.01); *H04N 13/257* (2018.05); *H04N 2209/048* (2013.01)

(58) Field of Classification Search
CPC .. H04N 5/23258; H04N 5/23267; H04N 5/33; H04N 5/357; H04N 5/372; H04N 9/64; H04N 13/204; H04N 13/257; H04N 2209/048

See application file for complete search history.

(56) References Cited

U.S. PATENT DOCUMENTS

| | | |
|---|---|---|
| 8,836,793 B1 | 9/2014 | Kriesel et al. |
| 9,204,041 B1 | 12/2015 | Campbell |
| 2002/0175268 A1 | 11/2002 | Smith |
| 2003/0147002 A1 | 8/2003 | Ray et al. |
| 2004/0036013 A1 | 2/2004 | Bacarella et al. |
| 2006/0081770 A1 | 4/2006 | Buchin et al. |
| 2006/0187326 A1 | 8/2006 | Spencer et al. |
| 2008/0157000 A1 | 7/2008 | Shamir et al. |
| 2008/0237771 A1 | 10/2008 | Pilla et al. |
| 2011/0042550 A1 | 2/2011 | Halahmi et al. |
| 2011/0069175 A1 | 3/2011 | Mistretta et al. |
| 2012/0212619 A1 | 8/2012 | Nagamune et al. |
| 2012/0314034 A1 | 12/2012 | Ott et al. |
| 2013/0063572 A1 | 3/2013 | Ramachandra et al. |
| 2013/0128003 A1 | 5/2013 | Kishida et al. |
| 2013/0141611 A1* | 6/2013 | Hirai .................. H04N 9/04557 348/E9.002 |
| 2016/0381345 A1 | 12/2016 | Wu et al. |
| 2017/0010850 A1 | 1/2017 | Kobayashi et al. |
| 2017/0251193 A1 | 8/2017 | Zhou et al. |

OTHER PUBLICATIONS

Nang, Jin, et al., "Fast Non-Local Algorithm for Image Denoising", Image Processing, IEEE, International Conference Oct. 2006, Atlanta, GA, 1429-1432.

* cited by examiner

COLOR NIGHT VISION CAMERAS, SYSTEMS, AND METHODS THEREOF

CROSS REFERENCE TO RELATED APPLICATIONS

This Application is a Continuation of U.S. application Ser. No. 16/802,210, filed 26 Feb. 2020, which issued as U.S. Pat. No. 10,798,355 on 6 Oct. 2020, which is a Continuation of U.S. application Ser. No. 16/517,451, filed 19 Jul. 2019, which was issued as U.S. Pat. No. 10,582,173 on 3 Mar. 2020, which is a Continuation of U.S. application Ser. No. 15/877,300, filed 22 Jan. 2018, which was issued as U.S. Pat. No. 10,362,285 on 23 Jul. 2019, which is a Continuation of U.S. application Ser. No. 15/357,788, filed 21 Nov. 2016, which was issued as U.S. Pat. No. 9,894,337 on 13 Feb. 2018, which is a Continuation of U.S. application Ser. No. 14/730,172, filed 3 Jun. 2015, which was issued as U.S. Pat. No. 9,503,623 on 22 Nov. 2016, which claims priority to U.S. Provisional Application No. 62/007,317, filed 3 Jun. 2014, wherein each is incorporated herein in its entirety by this reference thereto.

FIELD OF THE INVENTION

At least one embodiment of the present invention pertains to color night vision cameras and imagers, and associated methods, including the reduction of intensifiers to save cost and weight, as well as advanced processing techniques.

BACKGROUND

Monocular and stereo monochrome night vision systems are in widespread use in law enforcement, military, and recreational applications. These traditional systems are sensitive to the visible and infrared spectrum, but during light gathering and photon scavenging within the microchannel plate (MCP) photomultiplier tube, all color information is lost, which leaves a monochrome image illuminated by the green P43 phosphor at the rear of the tube. The application of the green P43 phosphor is chosen primarily because of the human eye's sensitivity toward this wavelength due to peak gain. As well, green wavelengths are the least bright signal viewable by the human eye, which, in turn, creates energy efficiencies in the system while concurrently keeping the viewer night adapted.

This image composed of monochromatic shades of green, leaves viewers starved for color information. Since color perception is a key factor in situational awareness, a full-color night vision system is useful for distinguishing objects from a background and identifying them.

A number of techniques for color night vision have been proposed and implemented, but generally require complex and expensive mechanisms and imagers. One technique is to require three input/output channels to represent the color spectrum, typically RGB (red, green, and blue), increasing to an impractical six intensifiers for stereo color vision.

An alternative technique is to use a spinning wheel or other mechanical apparatus to rapidly change color filters at the entrance and exit of a single intensifier. Both techniques drive up the cost and complexity, with increased weight and bulk that is especially critical for head-worn goggles.

The additional complexity associated with these approaches has slowed the adoption of color night vision systems. Thus, while it would be possible to simply combine the existing stereo, monochrome techniques and monocular, color techniques to yield stereo, color night vision functionality, the resulting system would be so complex and cumbersome as to make field usage impractical.

Another major issue with all night vision systems is image noise. All image amplification tubes used in night vision devices have inherent noise, seen as a distinctive speckling or scintillation of individual pixels from frame to frame, becoming more prominent as the gain (amplification) and/or operating temperature is increased. In a low-light environment, the shot noise from random photon arrivals tends to dominate the image and preclude its interpretation. Small amounts of color channel noise can easily dominate the chrominance signal in real-world scenes.

Ideally, a color night vision system should adapt to changing luminance and scenic parameters such that it automatically presents an easily interpreted, accurate rendering of the scene. A practical system must be portable, rugged, and not overly costly.

BRIEF DESCRIPTION OF THE DRAWINGS

One or more embodiments of the present invention are illustrated by way of example and not limitation in the figures of the accompanying drawings, in which like references indicate similar elements. The patent or application file contains at least one drawing executed in color. Copies of this patent or patent application publication with color drawing(s) will be provided by the Office upon request and payment of the necessary fee.

DETAILED DESCRIPTION

References in this description to "an embodiment", "one embodiment", or the like, mean that the particular feature, function, structure or characteristic being described is included in at least one embodiment of the present invention. Occurrences of such phrases in this specification do not necessarily all refer to the same embodiment. On the other hand, the embodiments referred to also are not necessarily mutually exclusive.

Introduced here are improved methods, systems and devices for color night vision that reduce the number of intensifiers and/or decrease noise.

In certain embodiments, the technique introduced here involves an effective color night vision system in which multiple spectral bands are maintained, filtered separately, and then recombined in a unique three-lens-filtering setup. This four-camera night vision system is unique in that its first three cameras separately filter different bands using a subtractive Cyan, Magenta and Yellow (CMY) color filtering-process, while its fourth camera is used to sense either additional IR illuminators or a luminance channel to increase brightness.

In some embodiments, an improved method and implementation of color night vision is implemented to distinguish details of an image in low light. The unique application of the three-lens subtractive CMY filtering allows for better photon scavenging and preservation of important color information.

CMY-Filtering Color Night Vision Camera

The following describes an effective color night vision system in which multiple spectral bands are maintained, filtered separately, and then recombined in a unique three-lens-filtering setup.

Figure 1:
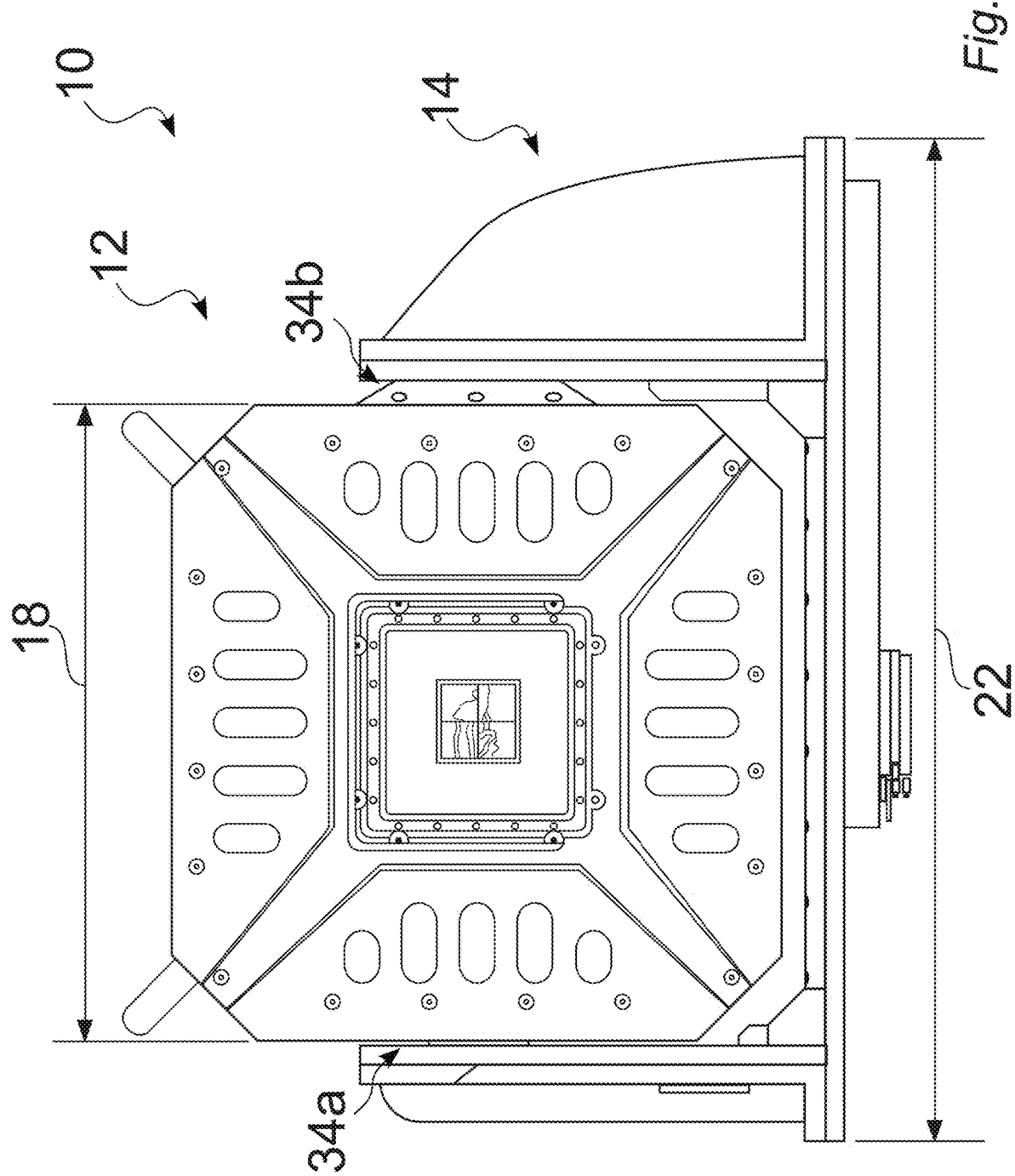
FIG. 1 is a front view of an illustrative embodiment of a color night vision camera.
Figure 2:
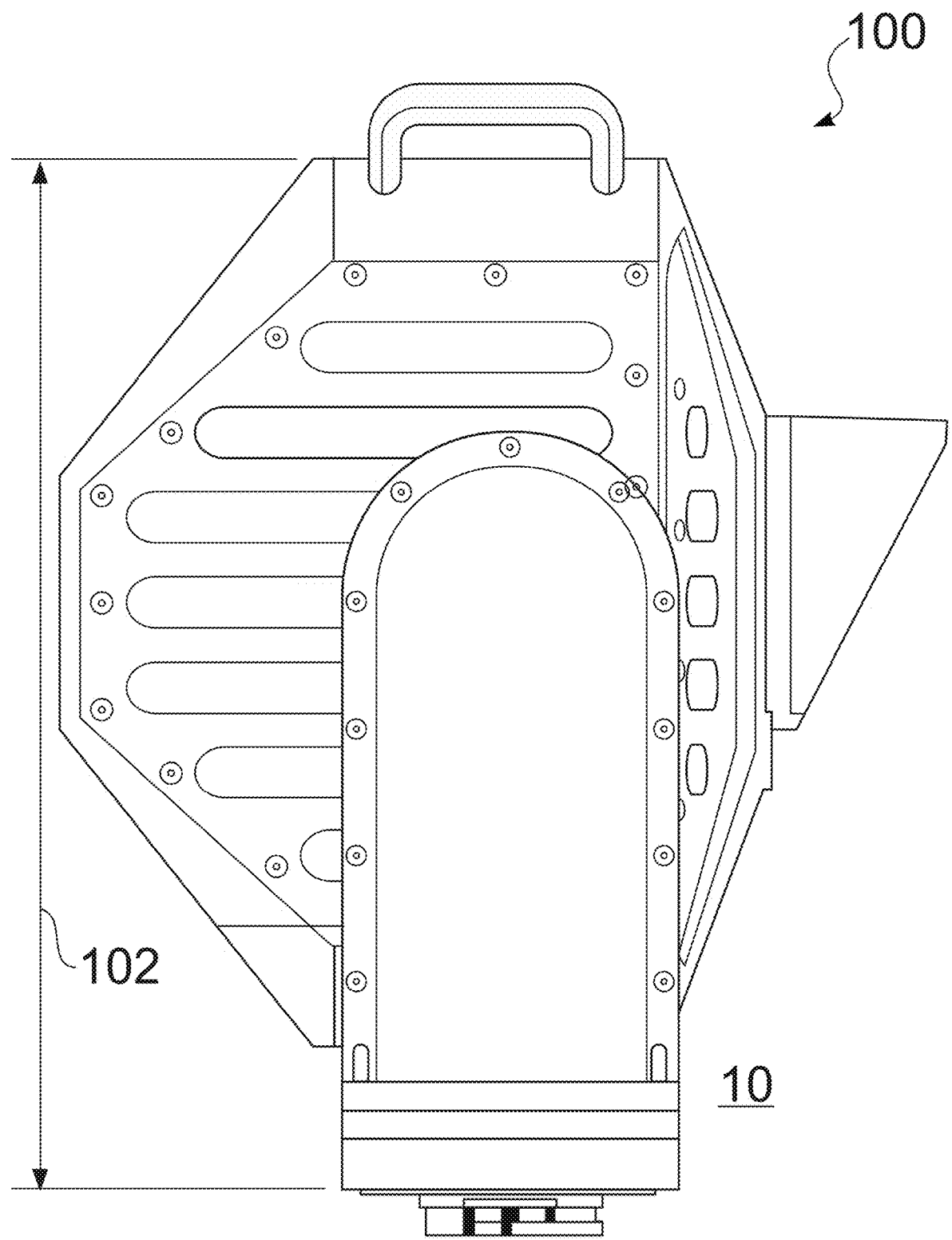
FIG. 2 is a right side view of an illustrative embodiment of a color night vision camera.
Figure 3:
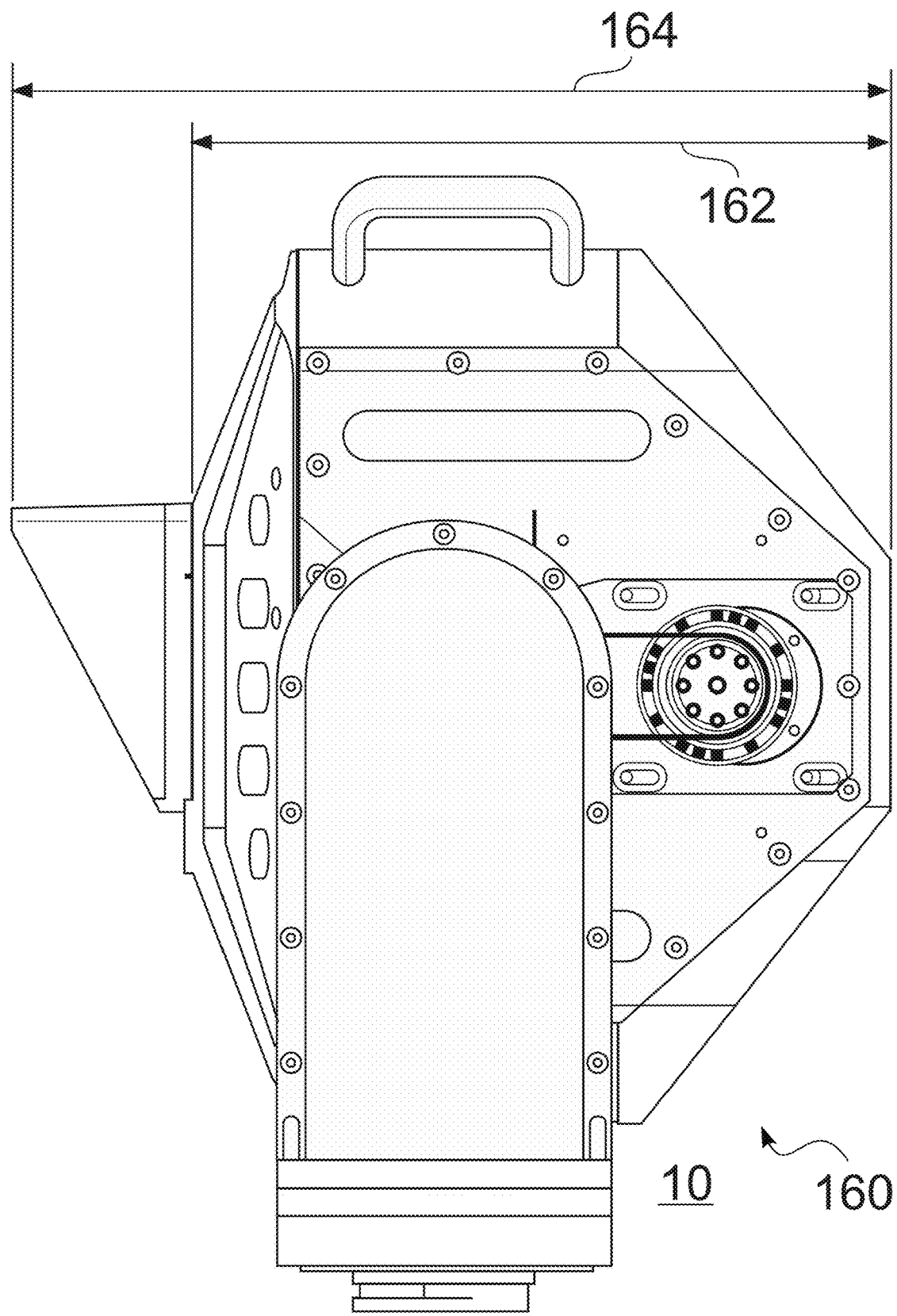
FIG. 3 is a left side view of an illustrative embodiment of a color night vision camera.
Figure 4:
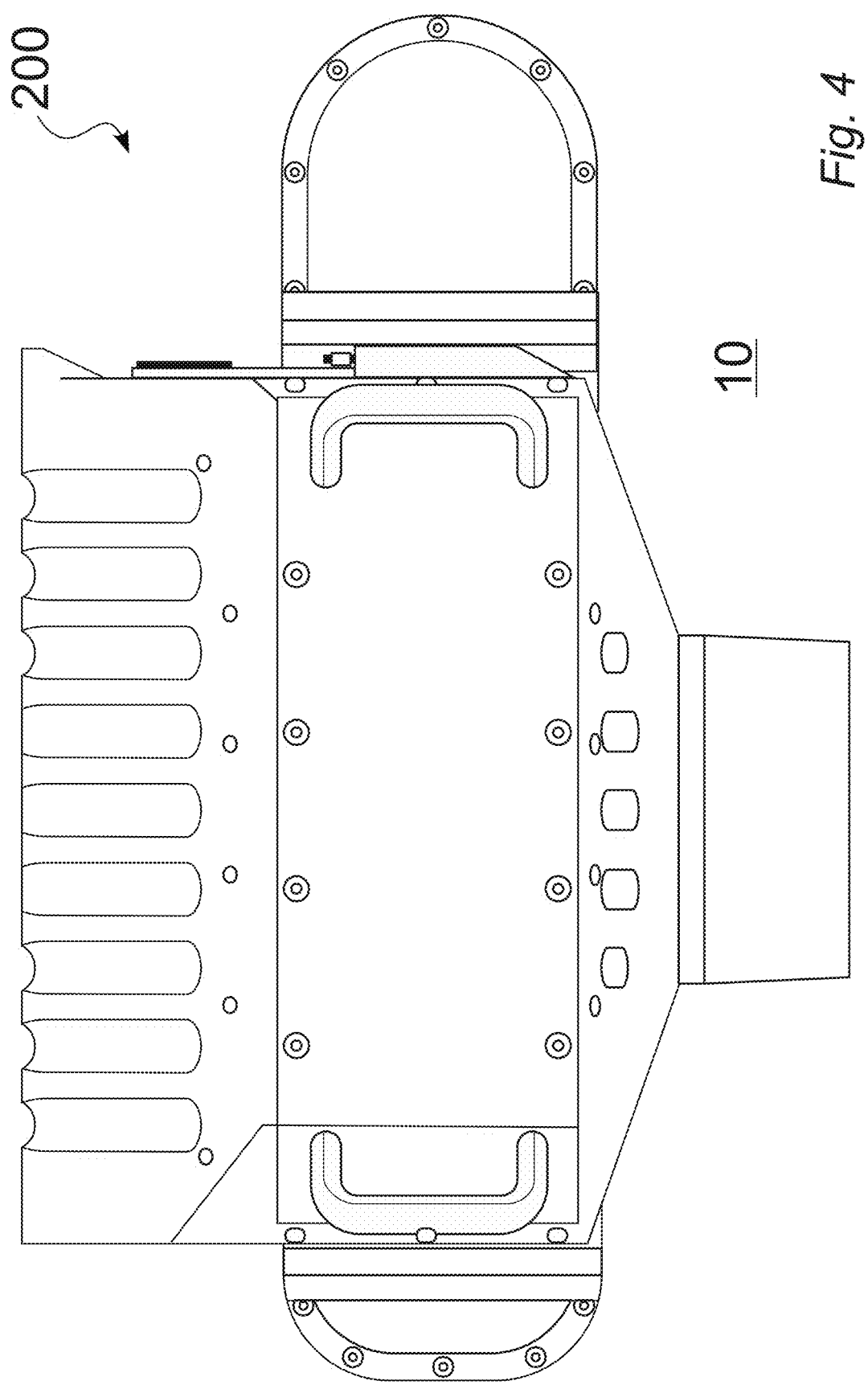
FIG. 4 is a top view of an illustrative embodiment of a color night vision camera.
Figure 5:
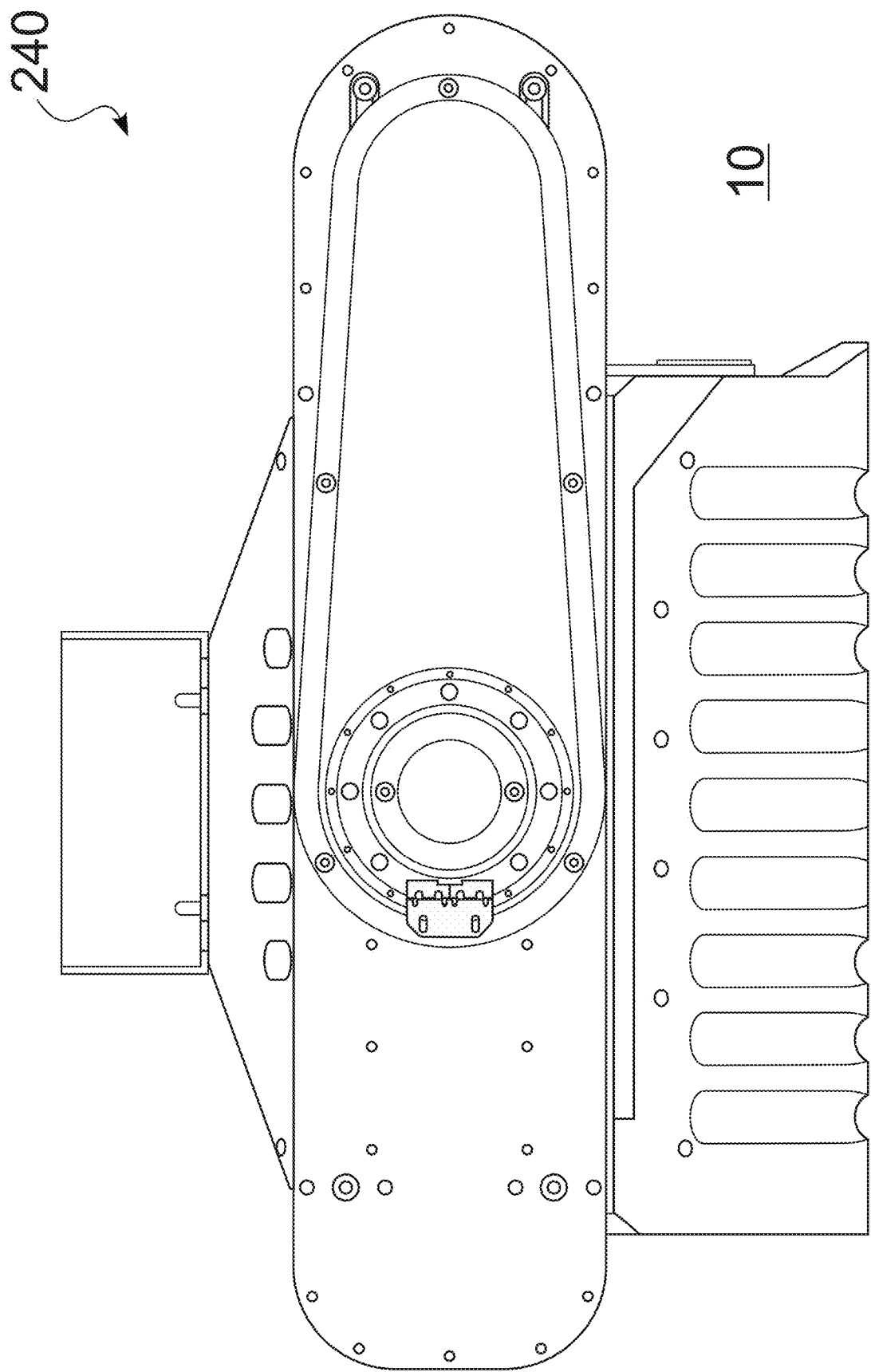
FIG. 5 is a bottom view of an illustrative embodiment of a color night vision camera.

FIG. 1 is a front view of an illustrative embodiment of a color night vision camera 10. FIG. 2 is a right side view 100 of an illustrative embodiment of a color night vision camera 10. FIG. 3 is a left side view 160 of an illustrative embodiment of a color night vision camera 10. FIG. 4 is a top view 200 of an illustrative embodiment of a color night vision camera 10. FIG. 5 is a bottom view 240 of an illustrative embodiment of a color night vision camera 10.

The illustrative color night vision camera 10 seen FIG. 1 includes a color night vision camera body 12 that is attached 34, e.g., 34a, 34b, to a camera housing 14. The illustrative color night vision camera body 12 shown in FIGS. 1-5 has a width 18 (FIG. 1), e.g., 16.50 inches, a height 102 (FIG. 2), e.g., 18.27 inches, a body depth 162 (FIG. 3), e.g., 12.51 inches, and an overall depth 162 (FIG. 3), e.g., 15.75 inches. The illustrative camera housing 14 seen in FIGS. 1-5 has a width 22 (FIG. 1), e.g., 26.03 inches.

Figure 6:
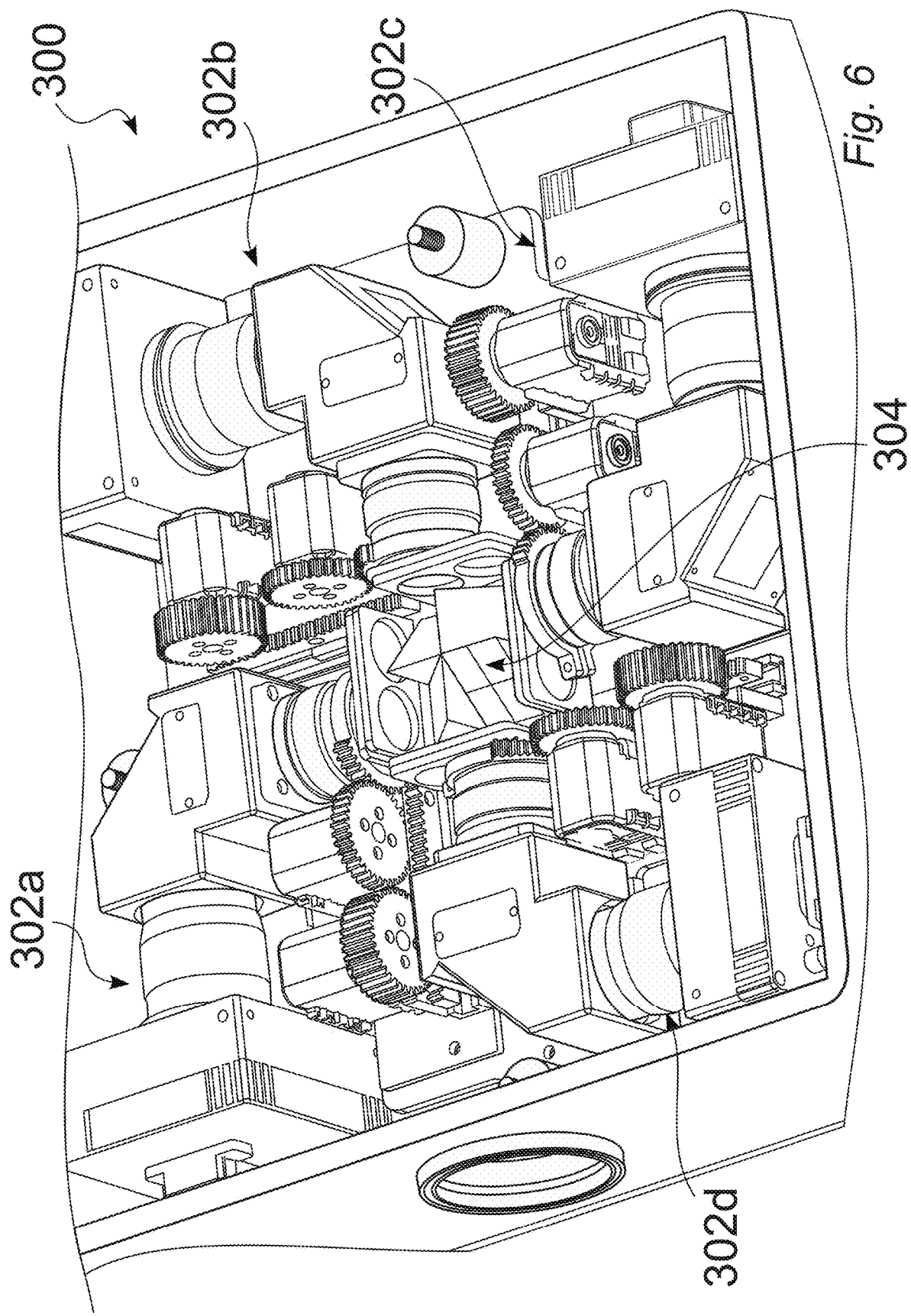
FIG. 6 shows four identical folded-optic camera assemblies arrayed around the central combining mirror assembly.

FIG. 6 is partial cutaway view 300 of four identical folded-optic camera assemblies 302, e.g., 302a-302d arrayed around the central combining mirror assembly 304 for an illustrative embodiment of a color night vision camera 10. Each assembly 302, e.g., 302a, is comprised of a high-resolution monochrome camera-link imager 306, a relay optic 308, an image-intensifier filter 310 iris motors 312, and an imaging lens 314.

This four-camera night vision system is unique in that its first three cameras 302, e.g., 302a-302c separately filter different bands using a subtractive Cyan, Magenta and Yellow (CMY) color filtering process, while its fourth camera 302, e.g., 302d, is used to sense either additional IR illuminators, or a luminance channel, e.g., 1304 (FIG. 16), to increase brightness. This subtractive CMY filtering process differs from the typical additive Red, Green and Blue (RGB) filters.

Figure 7:
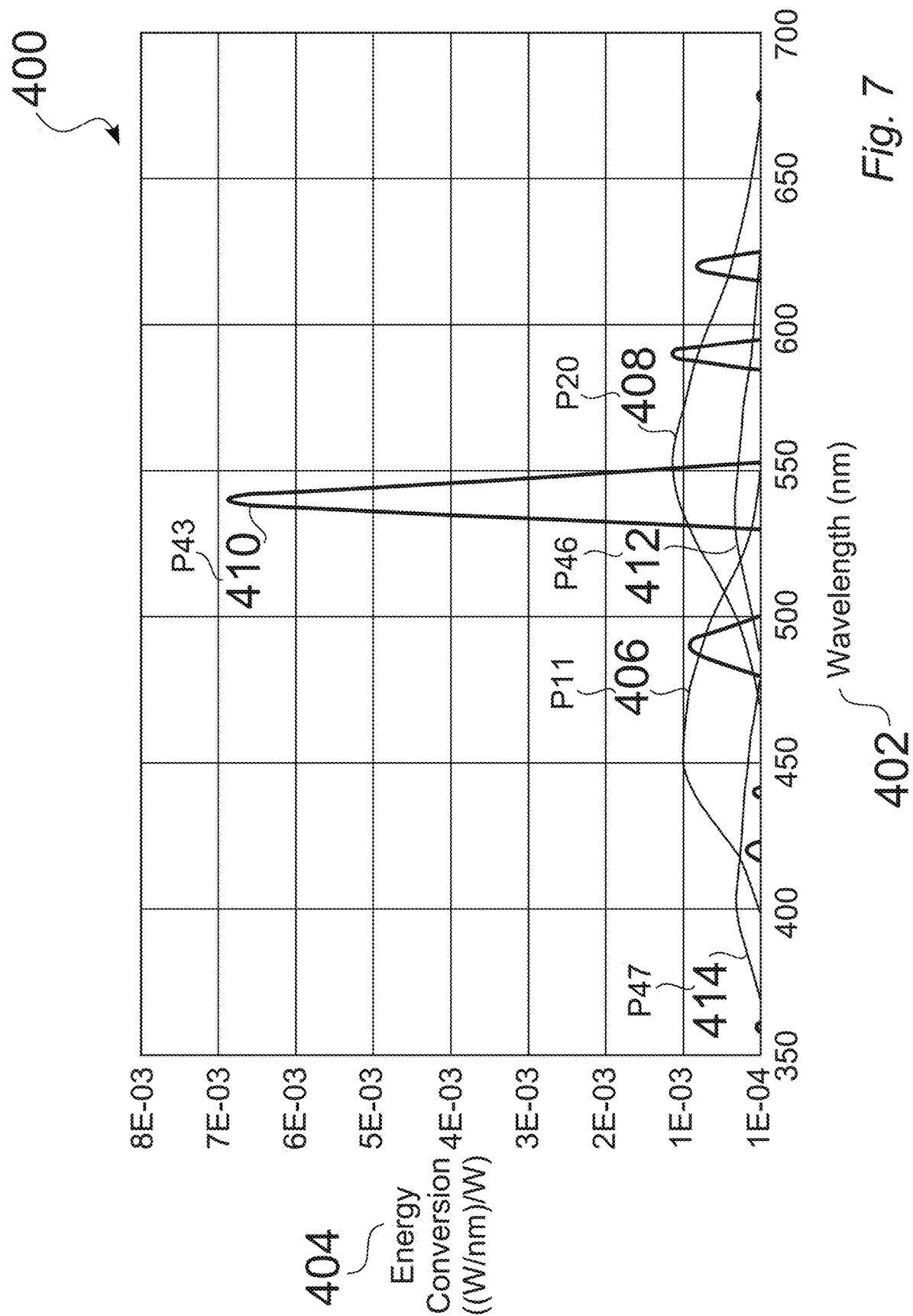
FIG. 7 is an illustrative chart of absolute emission spectra of common phosphors, per Watt absolute emission spectra of excitation power.

FIG. 7 is an illustrative chart 400 of absolute emission spectra 404 of common phosphors, including P11 phosphor 406, P20 phosphor 408, P43 phosphor 410, P46 phosphor 412, and P47 phosphor 414. The energy conversion 404 is shown per Watt absolute emission spectra of excitation power, as a function of wavelength 402. As seen in FIG. 7, P43 phosphor 410 is strongly peaked in a narrow band centered in the green at 545 nm.

Figure 8:
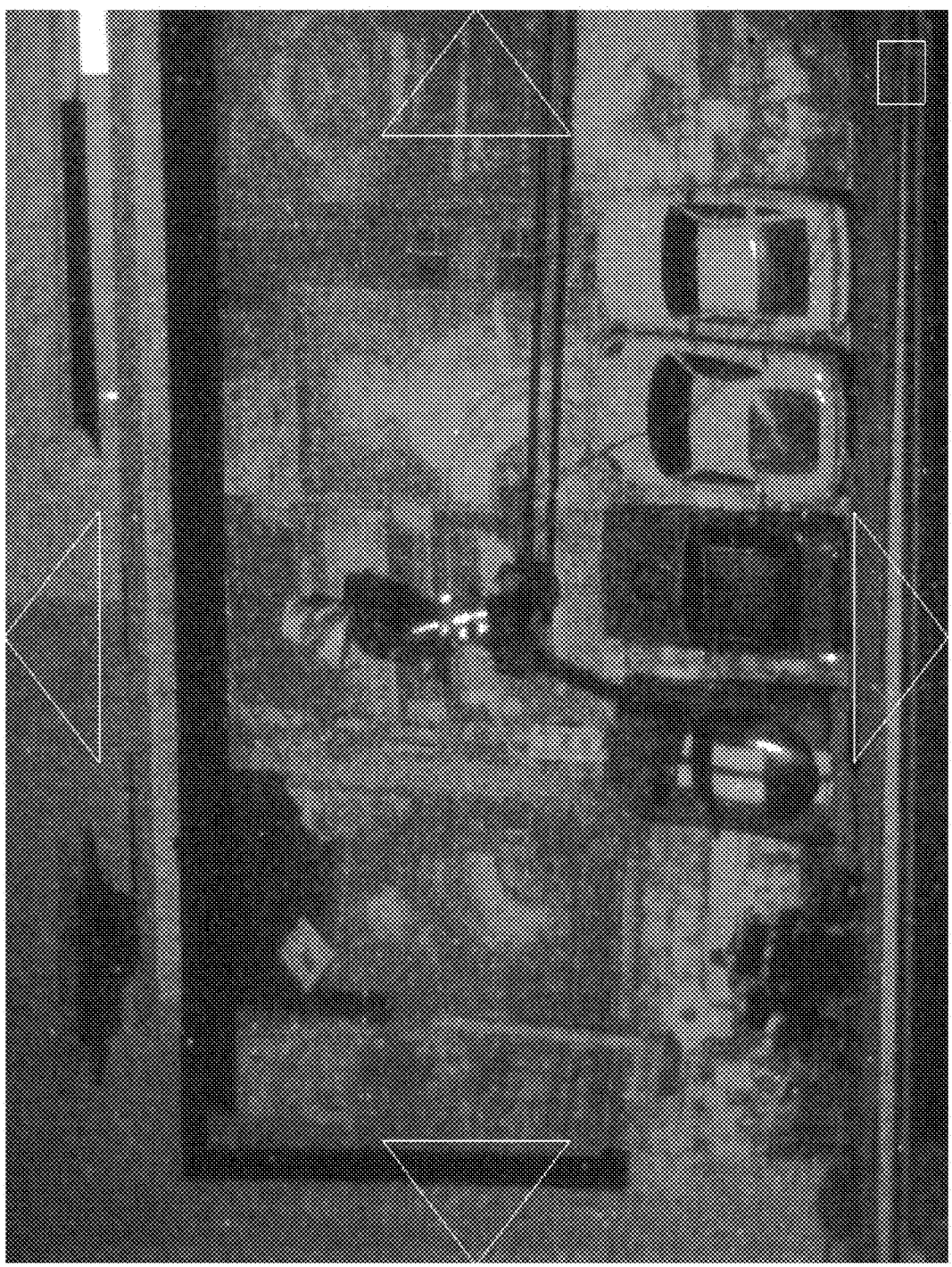
FIG. 8 depicts a live-action image taken from a typical night vision camera.

FIG. 8 depicts a live-action image 500 taken from a typical night vision camera. The image is in monochromatic shades of green, due to the P43 phosphor 410 that is commonly used in such cameras. The heavy intensifier speckling adds to the noise and difficulty of discerning objects within the scene.

Figure 9:
FIG. 9 depicts a live-action image taken with a color night vision camera, in the same dark conditions as shown in FIG. 8.

FIG. 9 depicts a live-action image 600 taken with a color night vision camera 10. This picture 600 was taken with no active illuminating infrared (IR) device, in the same dark conditions as shown in FIG. 8.

CMY filtering effectively allows the camera 10 and associated system 300 to capture more color information, in part, because each filter captures two sets of color information. For example, cyan filtering captures green and blue wavelengths, magenta filtering captures red and blue wavelengths, and yellow filtering captures red and green wavelengths.

By doubling the ability to capture photons, the camera 10 and associated system 700 increases the camera's aperture, without increasing the physical device's size. This high-quality hardware solution can also be coupled with an integrated software package and associated processing system.

Three-Lens CMY Filtering.

Figure 10:
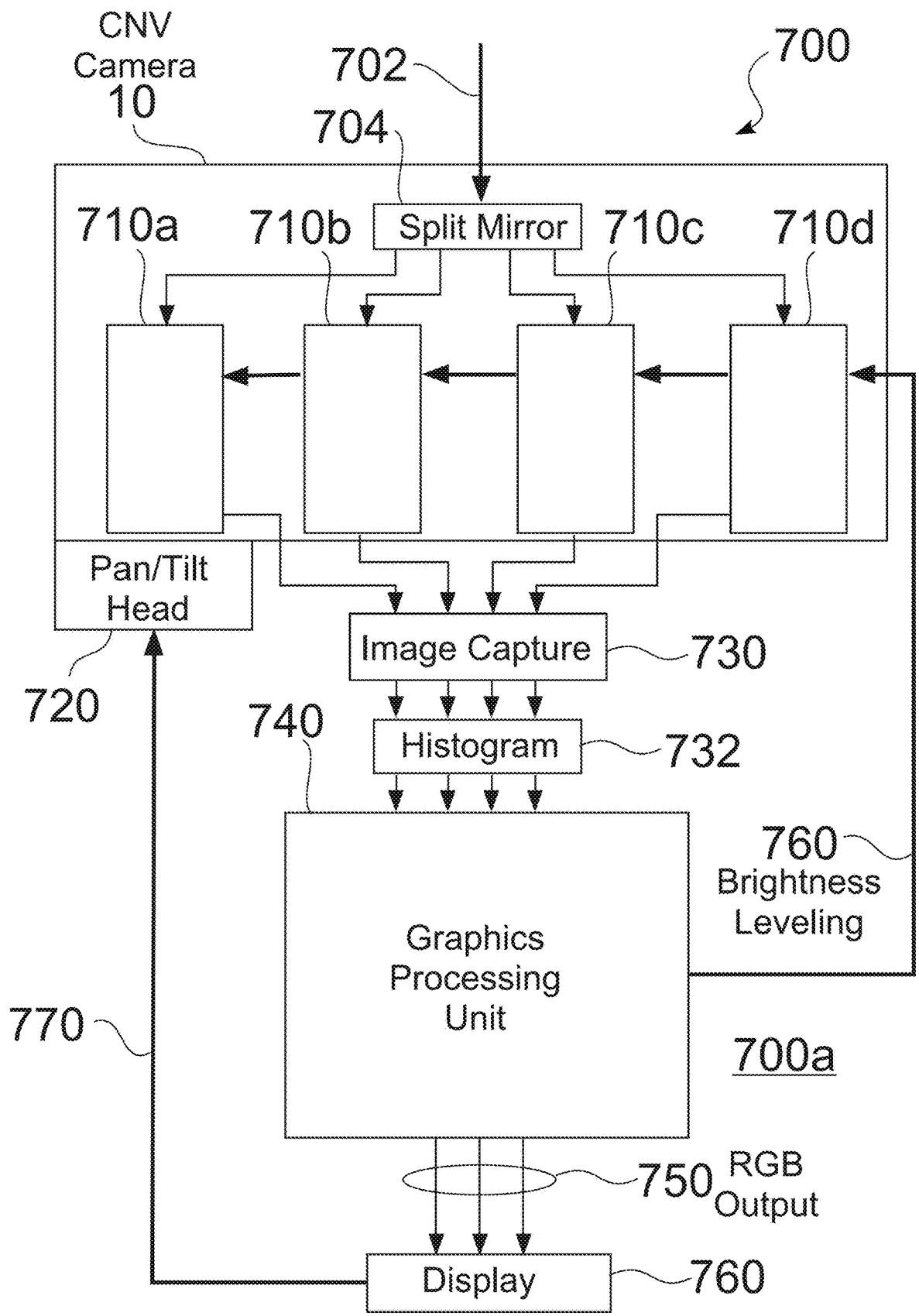
FIG. 10 is a schematic diagram of an illustrative color night vision system using subtractive CMY color filters.
Figure 11:
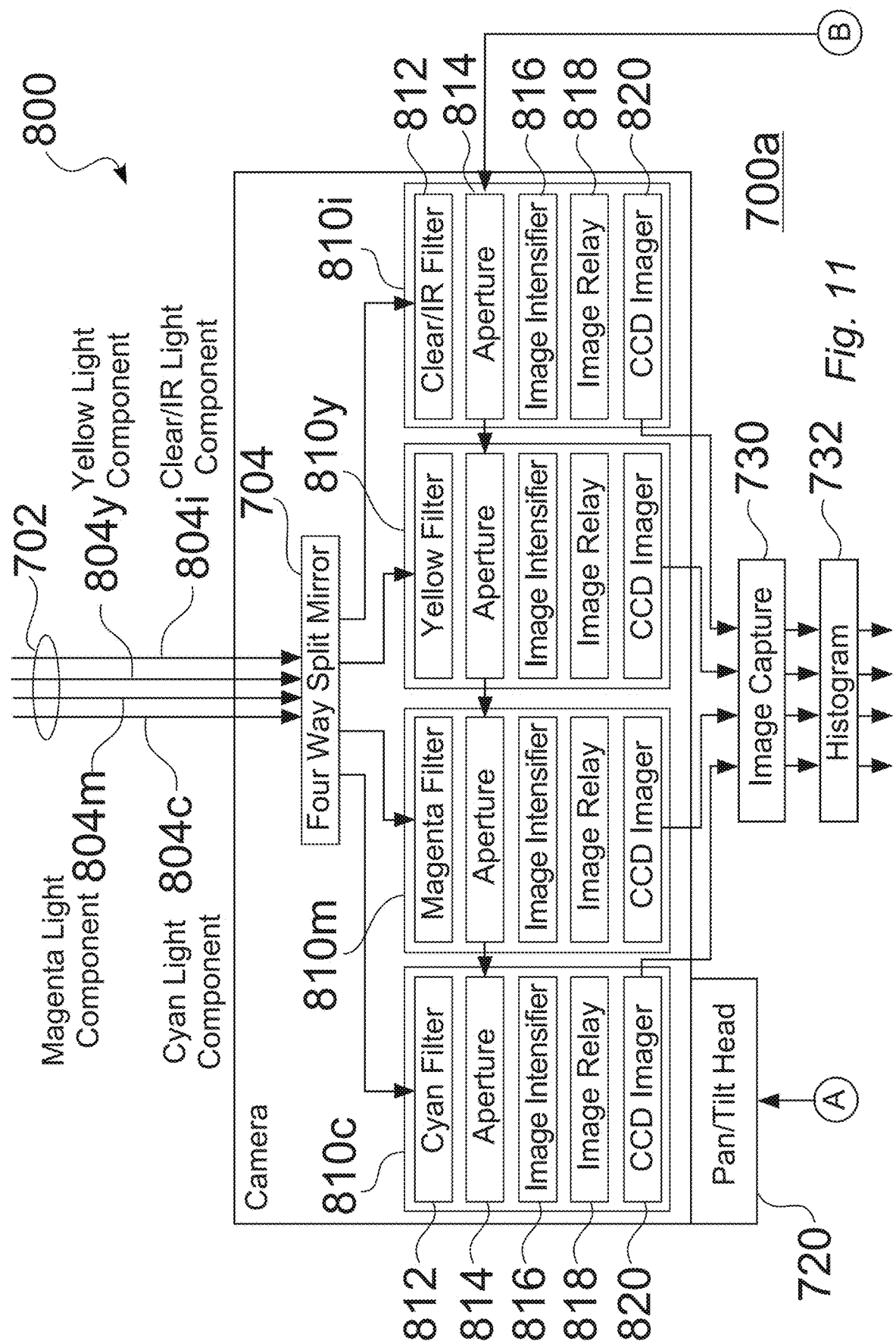
FIG. 11 is a detailed schematic diagram of a first portion of an illustrative color night vision system using subtractive CMY color filters.
Figure 12:
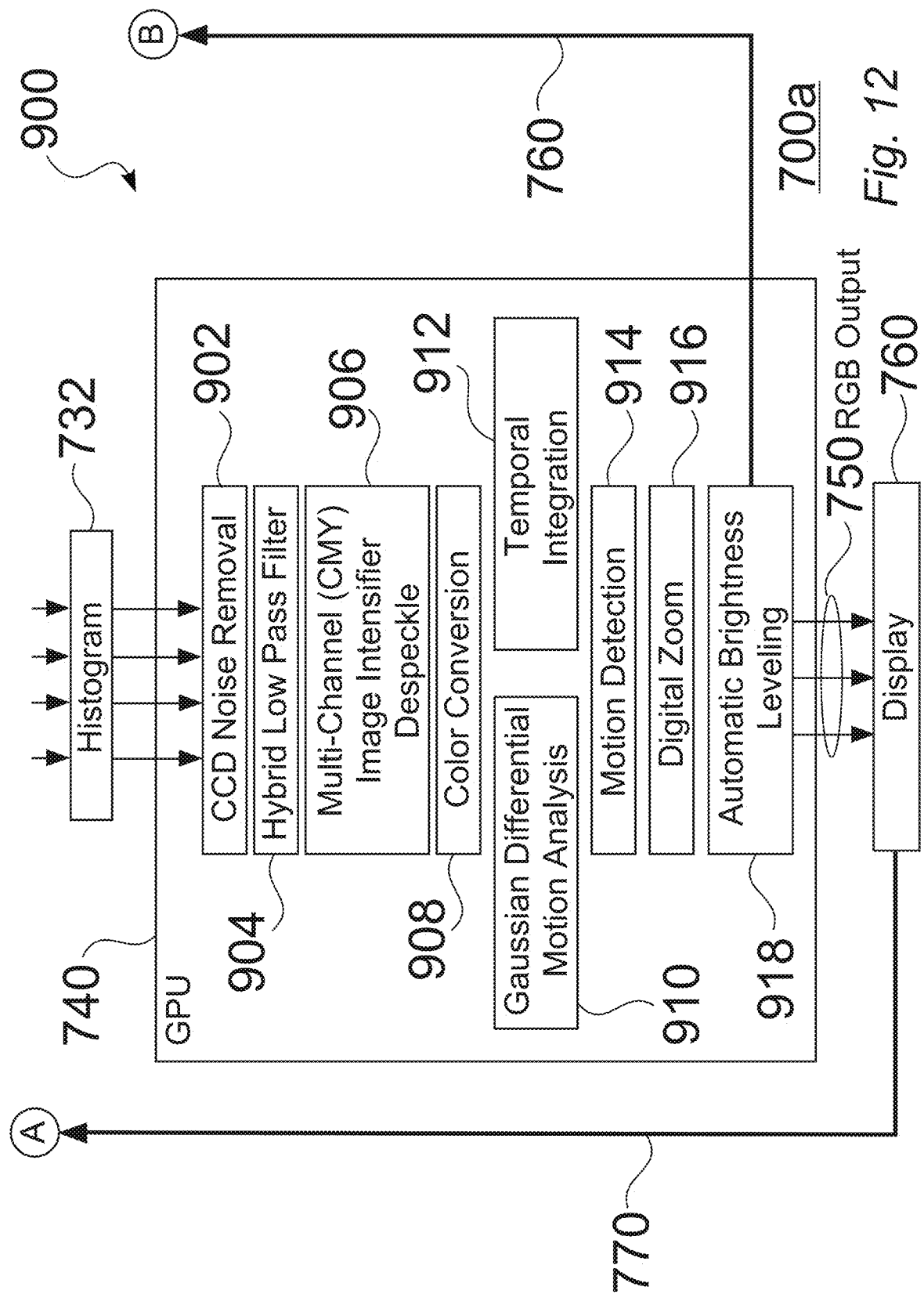
FIG. 12 is a detailed schematic diagram of a second portion of an illustrative color night vision system using subtractive CMY color filters.
Figure 13:
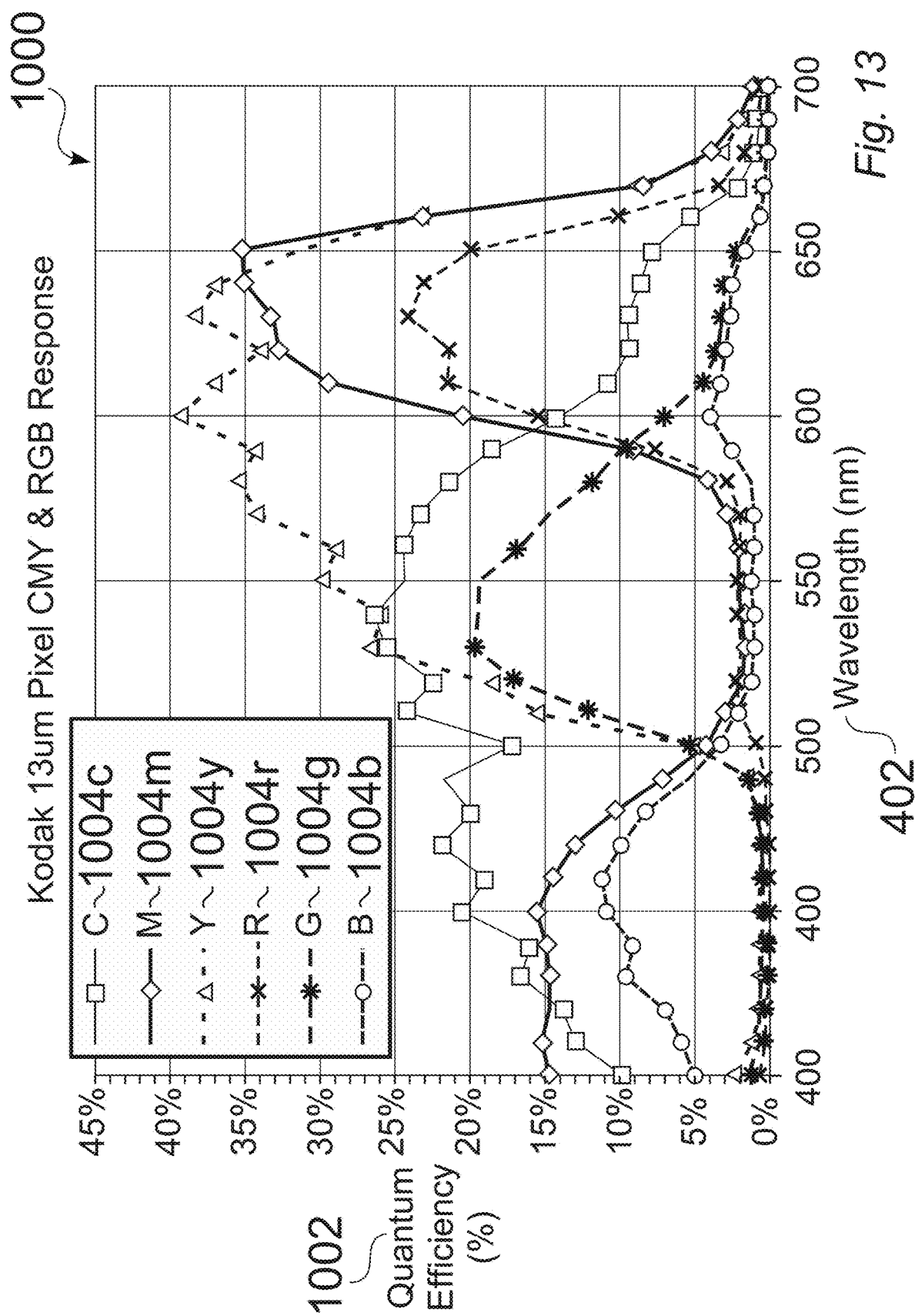
FIG. 13 is a chart that shows quantum efficiency as a function of wavelength for illustrative CMY color curves, as compared to that of RGB color curves.

FIG. 10 is a schematic diagram of an illustrative color night vision system 700 using subtractive CMY color filters 812 (FIG. 11). FIG. 11 is a detailed schematic diagram 800 of a first portion of an illustrative color night vision system 700 using subtractive CMY color filters 812. FIG. 12 is a detailed schematic diagram 900 of a second portion of an illustrative color night vision system using subtractive CMY color filters. FIG. 13 is a chart 1000 that shows quantum efficiency 1002 as a function of wavelength 402 for illustrative CMY color curves 1004*c*, 104*m*, 1004*y*, as compared to that of RGB color curves 1004*r*, 1004*g*, 1004*b*.

The unique application of the three-lens subtractive CMY filtering allows for better photon scavenging and preservation of important color information. CMY consists of Cyan, Magenta and Yellow, which are the chromatic complements of the additive primaries Red, Green and Blue (RGB), respectively. However, CMY are subtractive primaries, due to their effect in subtracting color from white light. Cyan is a combination of Blue plus Green, Magenta is a combination of Red plus Blue, and Yellow is a combination of Red plus Green. The system 700, night vision camera 10, and associated methods disclosed herein can therefore be configured to effectively double the amount of photons captured, thereby increasing our aperture without adding bulk.

A lookup table can be used to gamma-correct the CMY data, prior to converting it to the RGB color space, to be displayed on a display screen 760 (FIG. 12), e.g., an LCD display screen 760. Since CMY is made up of RGB components, the following linear equations (masking equations) can be used to convert between CMY and RGB space:

$C=1-R$; such that $R=1-C$;
$M=1-G$; such that $G=1-M$; and
$Y=1-B$; such that $B=1-Y$.

As well, this unique arrangement allows the system 700 to provide a higher quality image when removing noise, for embodiments wherein all color information is spatially encoded and separated on multiple intensifier tubes 810 (FIG. 11).

From the standpoint of efficiency, this CMY subtractive color system is highly advantageous, but there are more advantages as well. Because two subtractive color channels 710, e.g., 710*a* and 710*b*, have overlapping information, a bright "pop" of image noise originating in one of the intensifier tubes will not be seen in its neighbor, and therefore can be understood to be a noise event, and removed from the image 712.

In general, an increase in photon capture means a decrease in noise. As well, a parallel light path using a relay system increases quantum efficiencies due to the light path. The separation of these light paths is 22 mm or less from being coaxial. This is not ideal, but with the light paths being so close, the end result is less than 1 pixel disparity at distances of 40 feet or more.

Spatial and Temporal Integration.

The sensitivity of the system 700 can be increased by integrating one or more color channels 710, e.g., between a red channel 710*r*, a green channel 710*g*, and a blue channel 710*b*, either spatially by merging pixels, or temporally by combining light gathered over several frames. This increases the overall brightness of the available image, at the expense of reduced resolution from pixel merging or smearing of moving objects.

When merging images over several frames, an exponential filter can be used:

Alpha(1-alpha) filter:

Filter value=alpha*measurement+(1-alpha)*previous value;

wherein alpha is scaled to the amount of movement in the image, on a pixel by pixel basis, as determined by differential temporal analysis.

Image Processing.

In some current embodiments, the system includes a graphics processing unit (GPU) 740, which can provide features such as any of CCD noise removal 902, a hybrid low pass filter 904, multi-channel (CMY) image intensifier despeckle 906, color conversion 908, Gaussian differential motion analysis 910, temporal integration 912, motion integration 914, digital zoom 916, and automatic brightness leveling 918.

In some GPU embodiments 740, the image processing can be pre-formed using the superior processing available in current graphics cards, which in turn allows for high-resolution motion video, with minimal lag. The last few years have seen tremendous growth in graphics card capability, with graphics card performance in top of the line cards now more than double that currently implemented in night vision cameras.

Other key features can include intelligent time integration, which allows for selective image sharpness and brightness enhancement. Normal night vision systems are subject to the response time of the human eye and the way the eye reacts to the phosphors used in night vision scopes. Intelligent integration provides integration of areas where there is no sensed motion, to produce an image where typical night vision would falter. As well, this decreases the image lag typically associated with such integration techniques. While the existing camera-augmented night vision systems have fixed-pattern noise and fixed-column noise reduction, our added line-noise reduction filters out nearly all of the remaining noise. This leaves no negative effect on an integrated image and improves the quality of the live image.

Advanced noise removal techniques are implemented to further clarify the image quality. High frequency pattern noise, dark current, and high-pass-blur filters are all implemented on the graphics card.

Software improvements that aid in increasing system gain and noise reduction include:

Identifying all sources of noise from intensifiers and all other hardware in the imaging pipeline, then developing filters that are specific to each source.

Developing a per-pixel integration factor with motion detection, which gives us a brighter, clearer, more accurate image while being able to detect and present motion information.

Despeckling the CMY color filter. Due to the use of CMY color channels as source (and due to overlap of CMY in RGB color space) image intensifier noise is detected that shows up as errantly bright speckles in the live and integrated images. Noise reduction is then achieved by comparing channels and scoring or voting which channel has intensifier noise. This method is not limited to CMY color channels, and can be extended into multiple channels.

Developing a low-pass blur filter. The system maintains the integrity of low-pass data and blurs high-pass data, which in turn reduces shot noise while improving image detail over the original blur.

Developing a motion outline Sobel edge-detection pass, which in turn would highlight motion edges with a red color line. In other words, it would effectively draw a red line around moving images as an alert mechanism.

Development of customary camera controls. These controls can include:

Light—In bright lighting conditions, it closes the iris aperture; in dark lighting, it controls the brightness and contrast; in all lighting conditions, it controls color correction, gamma, saturation, and motion detection multipliers.

Motion—In high-motion scenes, integration is reduced and motion detection is increased; in static scenes integration is increased and the image clarity is improved.

Color—The image can be represented in full color (RGB); the image can be represented in full infrared (IR) as gray; the image can be represented in full color plus IR as red; lastly the image can be represented in full IR as red only.

Due to low-light gathering capabilities, night vision systems tend to have a lot of shot noise associated with them. On the quantum level, photon shot noise stems from the randomness associated with photon arrivals. Random photon arrivals typically follow a Poisson distribution, whose signal-to-noise ratio increases as the square-root of the light intensity. At very low light levels, where only a few photons are captured per pixel per frame, temporally fluctuating shot noise can dominate the image and hinder interpretation.

Additionally, image intensifiers produce dark noise, which mimics the appearance of random photon arrivals, but is not correlated with the image. It characteristically will produce image speckles, which are independent within each intensifier and therefore are amenable to removal through the detection of uncorrelated image speckles. Since dark noise sets a fundamental lower bound to the light levels, which can be reliably detected, it is greatly advantageous to minimize dark noise effects through intelligent filtering techniques. Dark noise filtration as well as high frequency pattern noise removal, dark current subtraction, and low-pass blur filters, are all implemented in real time on the high-performance graphics card.

A simplified color night vision system can be achieved by reducing the number of intensifiers 810 from the conventional six for stereo vision (three per eye) to four, three, or two, e.g., one for monocular vision.

Figure 14:
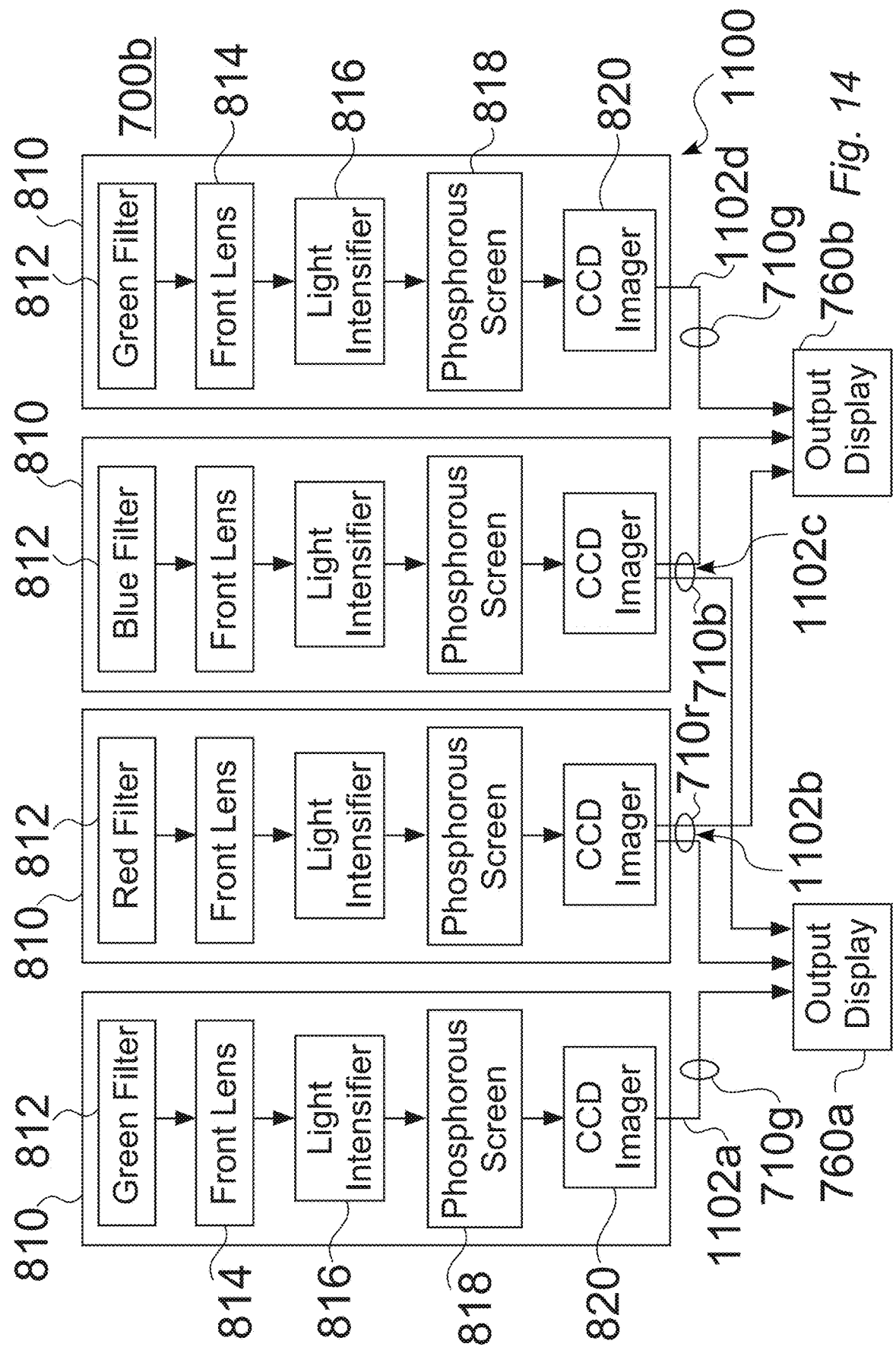
FIG. 14 shows an illustrative schematic diagram of an embodiment of a color night vision system which includes four intensifier tube assemblies, four CCD imagers, and a pair of output displays.

FIG. 14 shows an illustrative schematic diagram 1100 of an embodiment of a color night vision system 700b which includes four intensifier tube assemblies 810, four charge coupled device (CCD) imagers 820, and a pair of output displays 760, e.g., 760a, 760b. The optical axes of the four intensifier tube assemblies 810 are aligned parallel to one another, with two intensifier tube assemblies 810 offset from one another along one (preferably horizontal) dimension and the two other intensifier tube assemblies 810 offset from one another along a perpendicular (preferably vertical) dimension. The segments connecting the offset pairs of intensifier tube assemblies 810 preferably intersect one another at their respective midpoints.

Each intensifier tube assembly 810 includes a filter 812, a front lens 814, a light intensifier 816, and a phosphorous screen 818, which acts as an image relay. A CCD imager 820 associated with each intensifier tube assembly 810 digitizes the output of the light intensifier 810, as rendered on the phosphorous screen 818. The outputs of the four CCD imagers 820 are then each assigned to a color channel 710. In the illustrative system 700b seen in FIG. 14, one output 1102b is assigned to a red channel 710r, one output 1102c is assigned to a red channel 710r, and two outputs 11021, 1102d are assigned to green channels 710g. Preferably, the vertically offset intensifier tube assemblies 810 are assigned to red and blue channels 710r and 710b and the horizontally offset intensifier tube assemblies 810 are assigned to green channels 710g, termed the "right" and "left" channels, respectively.

The color channels 710 are then combined to form two composite color images displayed on the pair of output displays 760, e.g., 760a, 760b. So that the colors within the composite color images closely correspond to the actual color of the viewed subject matter, the filter 812 within each intensifier tube assembly 810 is selected to pass wavelengths of light corresponding to the assigned color channel 710. For example, the filter 812 within the intensifier tube assembly 810 assigned to the red channel 710 seen in FIG. 14 can be a relatively broad, notch-pass filter passing red wavelengths of light.

Each composite color image is composed from one of the two green channels, and a shifted representation of each of the red and blue channels. To create the shifted representation, the pixels within the imagery received from the channel 710 are first displaced, to compensate for the (preferably vertical) offset between the red channel 710r and the blue channel 710b. The pixels are then displaced along the perpendicular (preferably horizontal) dimension in one direction, for the left composite color image, and in the opposite direction for the right composite image.

The human visual system is capable of relying upon depth information present within one spectral band, even if the visual information in complementary bands does not contain similar depth information. For example, U.S. Pat. No. 6,597,807 notes that "[i]f the fusion of one of the colored imagery layers produces depth perception information in one portion of the scene whereas the other two colored layers do not, the human mind can retain the information from this color and discard the inputs from the other two colors as noise".

Thus, when viewed separately by the left and right eyes of the user, the composite color images provide an effective stereo imagery pair, despite an absence of stereo information in the red and blue color channels 710r, 710b. Furthermore, the color night vision system 700b can maximize the effectiveness of the stereo pair, by presenting the stereo information in the green channel 710g displaying wavelengths to which the human eye is most sensitive. The color night vision camera 10 and system 700b can thus reduce the number of intensifier tube assemblies 810 to four from six (as would be required by a two-intensifiers-per-RGB-channel device), with little reduction in stereo imaging quality. The resulting color night vision camera 10 can therefore be comparatively light and compact, and therefore more suitable for use in head-mounted applications.

Generally, the magnitude of the displacement applied to the pixels in each dimension is dependent on the offset between the intensifier tube assemblies 810 along that dimension and the distance at which the subject matter is located, with subject matter at lesser distances requiring a greater displacement. In one variation of the color night vision system 700, a "typical subject matter distance" is determined for the system at the time of manufacture (presumably based on the intended usage of the device). All pixels within the image are displaced in accordance with this distance at all times. Those portions of the image containing subject matter at a distance substantially different than the typical distance will exhibit blue and red (or perhaps purple) fringing. To minimize this effect, the (preferably vertical) offset between red and blue intensifier tube assemblies 810 can be reduced as far as allowed by the physical diameters of the intensifier tube assemblies 810.

In another variation of the color night vision system 700, the distance upon which the pixel displacement is based can be adjusted by the user. In this variation, the displacement remains constant for all pixels within an image, but can vary in time. Alternatively, a time varying displacement can be automatically determined based on an "average subject matter distance" computed from a stereo correspondence performed upon the two green channel images and applied to all pixels within the image. In yet another variation of the color night vision system 700, the pixel displacement varies both in time and within an image (from pixel to pixel) based on a dense correspondence computed in real-time for the two green channel images.

As the blue and red fringing noted above can prove distracting in some situations, the color night vision system 700 preferably provides a switch or button with which the user can disable the color composition functionality. When the color composition is disabled, the composite images are composed directly from the green channels to provide a conventional stereo, monochrome image pair.

Variations of the color night vision system 700 based on color spaces other than RGB are also possible. In one such variation, based on the CMY color space, stereo cyan channels are combined with shifted representations of monocular magenta and yellow channels 710 to create the composite color channel.

Figure 15:
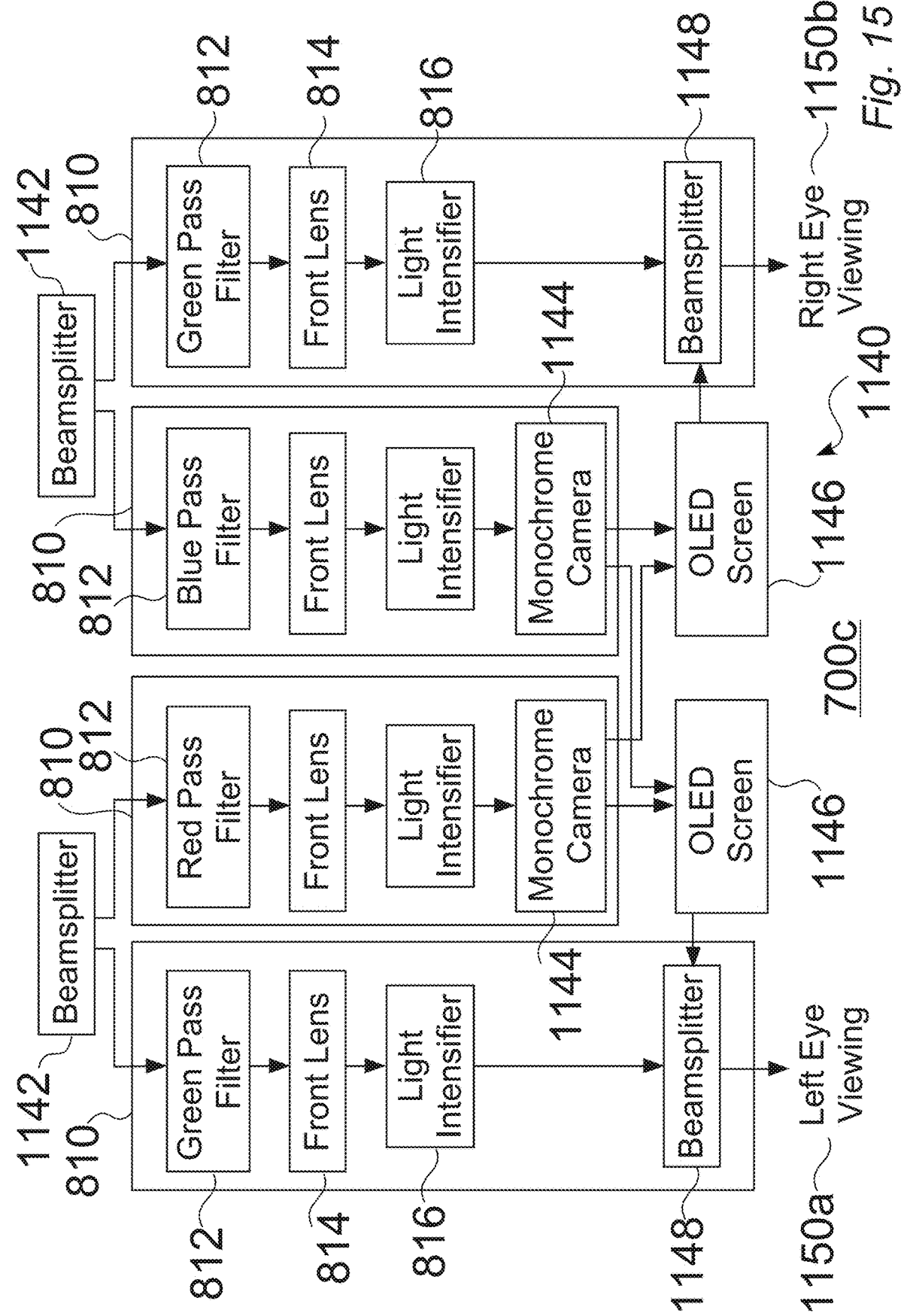
FIG. 15 shows an illustrative schematic diagram of an embodiment of an illustrative color night vision system that includes four intensifier tube assemblies, and beamsplitters between each of the intensifiers and eye viewing.

FIG. 15 shows an illustrative schematic diagram of an embodiment of an illustrative color night vision system 700c which includes four intensifier tube assemblies 810 and beamsplitters 1148 between each of the intensifiers 816 and eye viewing 1150, e.g., 1150a,1150b.

The green channel 710g can be used for luminance information to extract the maximum quality image possible. The color night vision system 700c separates the green channel for direct stereo viewing, which contains the brightest and sharpest image information, from other color channels 710, which are viewed in monocular vision, thus reducing the number on intensifiers 810 required from six to three or four.

The illustrative color night vision system 700c seen in FIG. 15 has four image intensifier tube assemblies 810. Two of the intensifier assemblies 810 are fitted with a green pass filter at the front of the tube and placed for direct viewing by the left and right eyes. This provides a conventional monochrome stereo image to the user at the green frequencies to which the human eye is most sensitive. A beamsplitter 1148 is interspersed between each intensifier and the eye.

The vast majority of image detail lies in the luminance channel, with the chrominance channel adding very little information. Since human eyes are most sensitive to the green bandwidth, it can be advantageous to make this channel supply the luminance information without obstruction by color filters.

To provide color information, two additional image intensifiers 810 are vertically stacked between the green-filtered direct view intensifiers 810, one with a red filter 812 and one with a blue filter 812. The axes of all four intensifiers 810 are aligned. Monochrome cameras 1144 view the red- and blue-filtered intensifiers 816, and send their color channels to an organic light-emitting diode (OLED) display 1146 beside each beamsplitter 1148. The beamsplitter 1148 combines the direct view green channel with the displayed red and blue channels.

To avoid false stereo cues, the red and blue channels 710 can be slightly defocused. An alternative method to avoid false stereo cues is to use a beamsplitter 1142 on the input side as well, with part of the light going to the direct view stereo green channel and some going to the separate red and blue mono channels 710.

Optionally, a CCD camera 820 (FIG. 14) on the opposite side of the beamsplitter 1148 can view the green channel 710g, if further processing and independent display are desired.

In other embodiments, the red, green, and blue channels 710 can be replaced with magenta, cyan, and yellow channels, or the red and blue intensifiers 816 and cameras, e.g., 1144, can be replaced with IR and UV sensitive cameras, to permit overlay of broad spectrum visual information.

The result is color night vision using only four intensifiers 810, with direct viewing 1150a,1150b of the most important channel (green) 710g, in terms of brightness and sharpness.

Figure 16:
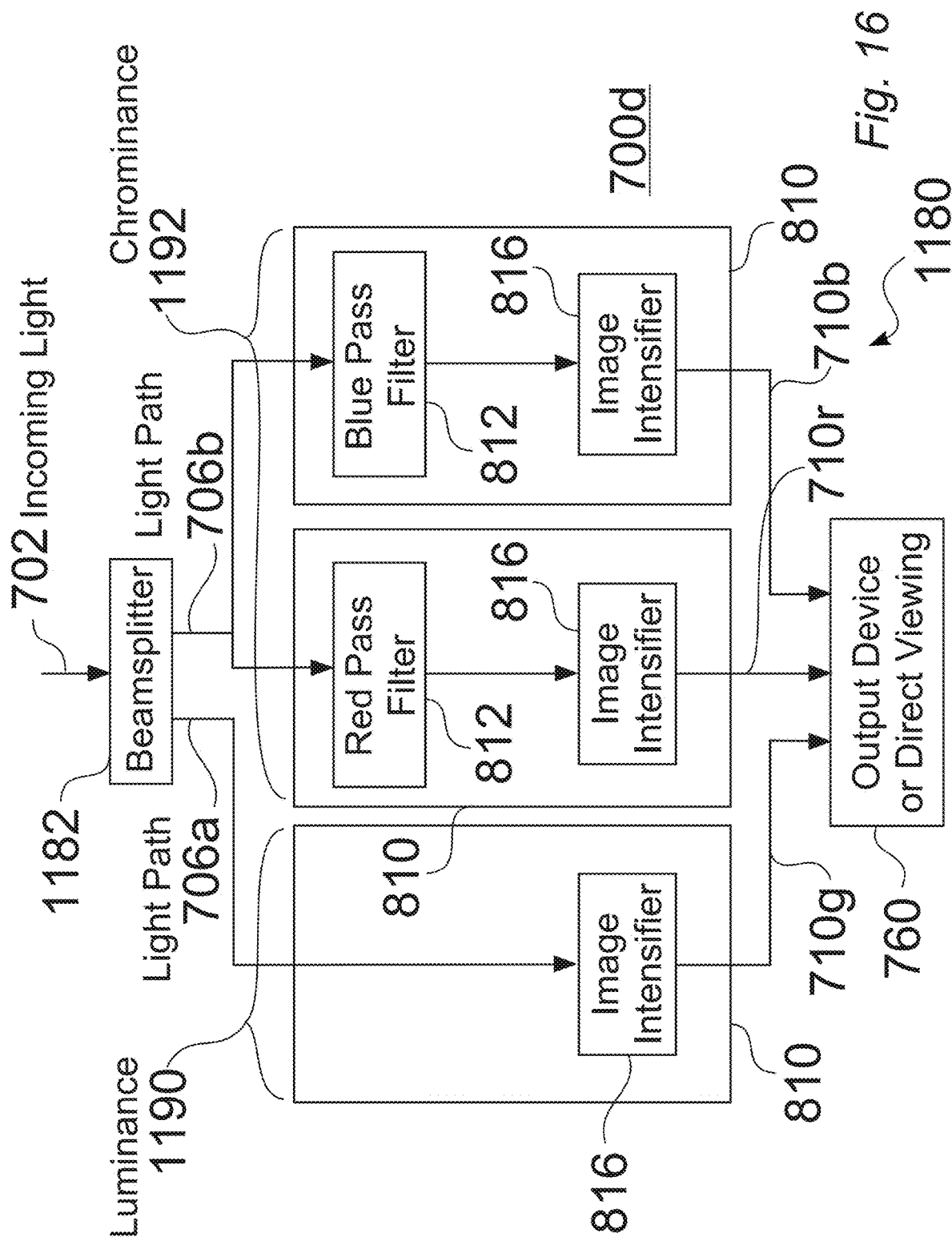
FIG. 16 shows an illustrative schematic diagram of an embodiment of a color night vision system that includes three intensifier tube assemblies to provide a luminance channel and a chrominance channel.

FIG. 16 shows an illustrative schematic diagram of an embodiment of a color night vision system 700d that includes three intensifier tube assemblies 810, to provide a luminance channel 1190 and a chrominance channel 1192. The illustrative color night vision system 700d seen in FIG. 16 takes advantage of the fact that the vast majority of image detail lies in the luminance channel 1190, while a chrominance channel 1192 (FIG. 16) adds very little information. Since human eyes are most sensitive to the green bandwidth, the illustrative color night vision system 700d see in FIG. 16 makes this channel 710 supply the luminance information, without obstruction by color filters. This separation into chrominance 1192 and luminance 1190 channels results in high spatial and temporal resolution, and potentially further reduces the number of intensifiers 810 to a total of three.

A beam splitter 1182 divides light coming in from an imaging lens into two light paths 706, e.g., 706a, for green, which is treated as luminance 1190, and a second band 706, with all other frequencies, which is treated as chrominance 1192.

The green, or luminance, band 706a is fed to an image intensifier 816 for direct viewing 760, while the other (chrominance) channels 706b are sent to the separate red and blue channels 710r and 710b, as above. Alternatively, a single chrominance channel 1192 can be used and filtered for color using rotating color filters or an electro-optic filter before being sent to a separate intensifier 816.

The output of the intensifiers 816 can be overlaid and displayed 760 on a CRT or other output device, or optically combined for direct viewing.

In contrast to systems which use temporal or spatial scanning of the entire bandwidth and a single intensifier, the illustrative color night vision system 700d seen in FIG. 16 has the advantage of high spatial and temporal resolution of the luminance channel, which is the most important channel for vision.

Further improvement can be achieved by treating the chrominance 1192 as luminance 1190 in very low light levels, e.g., reverting to a conventional monochromatic display.

Figure 17:
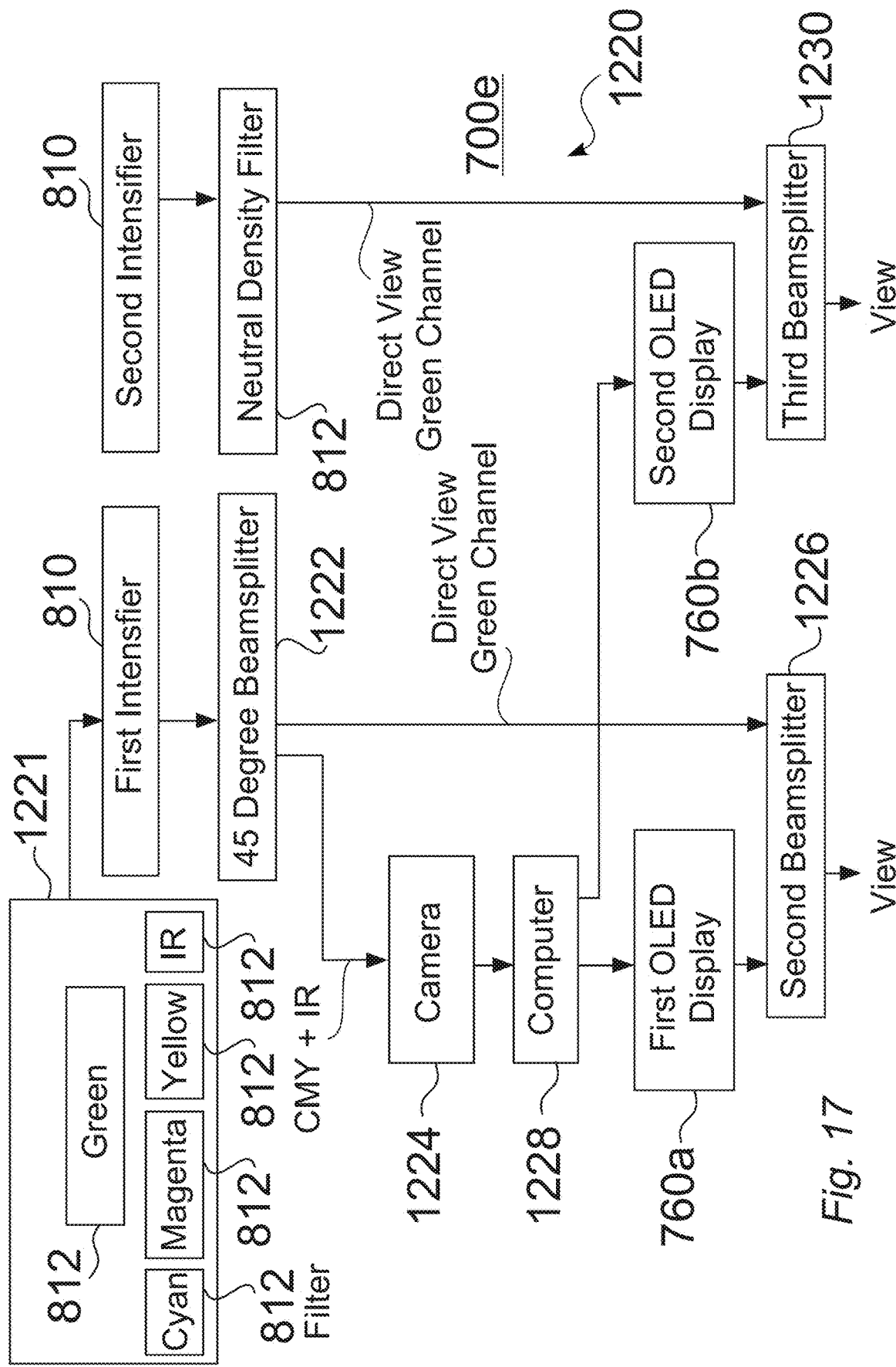
FIG. 17 shows an illustrative schematic diagram of an embodiment of a color night vision system that includes two intensifier tube assemblies 810.

FIG. 17 shows an illustrative schematic diagram of an embodiment of a color night vision system 700e that includes two intensifier tube assemblies 810. The illustrative color night vision system 700e seen in FIG. 17 reduces the number of required intensifiers 810 to a total of two (one per eye). The first intensifier 810 contains filters 812 distributed throughout its area for cyan, magenta, yellow, and infrared (CMY+IR), interspersed with a large majority of conventional green filters 812. The intensifier output is directed to a 45-degree beamsplitter 1222. One resulting beam reflects to a camera 1224, which sends the CMY+IR channels to a computer 1228.

The computer reconstructs red and blue information from the CMY+IR filters and outputs to an OLED display 760, e.g., 760*a*. The other beam 1126 continues to a second beamsplitter, where the OLED display 760*a* is combined with the directly viewed green channel information for viewing.

The second intensifier 810 is coupled to a neutral density filter 812, which reduces its light output to match the loss suffered by the first intensifier 810 from the first beamsplitter 1222. A beamsplitter 1230 allows combination of its direct view green channel with red and blue information from a second OLED 760, e.g., 760*b*, produced by the same camera 1224 and computer 1228 output as the first intensifier 810.

The OLED input can also be used to place textual or graphical overlays on the color night vision camera's output. Alternatively, direct viewing could be eliminated by placing a camera 760 on the second intensifier 810, and presenting the combined channel output on the OLED 760 on both sides.

Yet another embodiment removes the CMY+IR filters from the eyepiece intensifiers 810, instead adding a third intensifier 810 with a dense CMY+IR pattern. The output from that intensifier 810 feeds the OLEDs 760 in each eyepiece intensifier 810.

Figure 18:
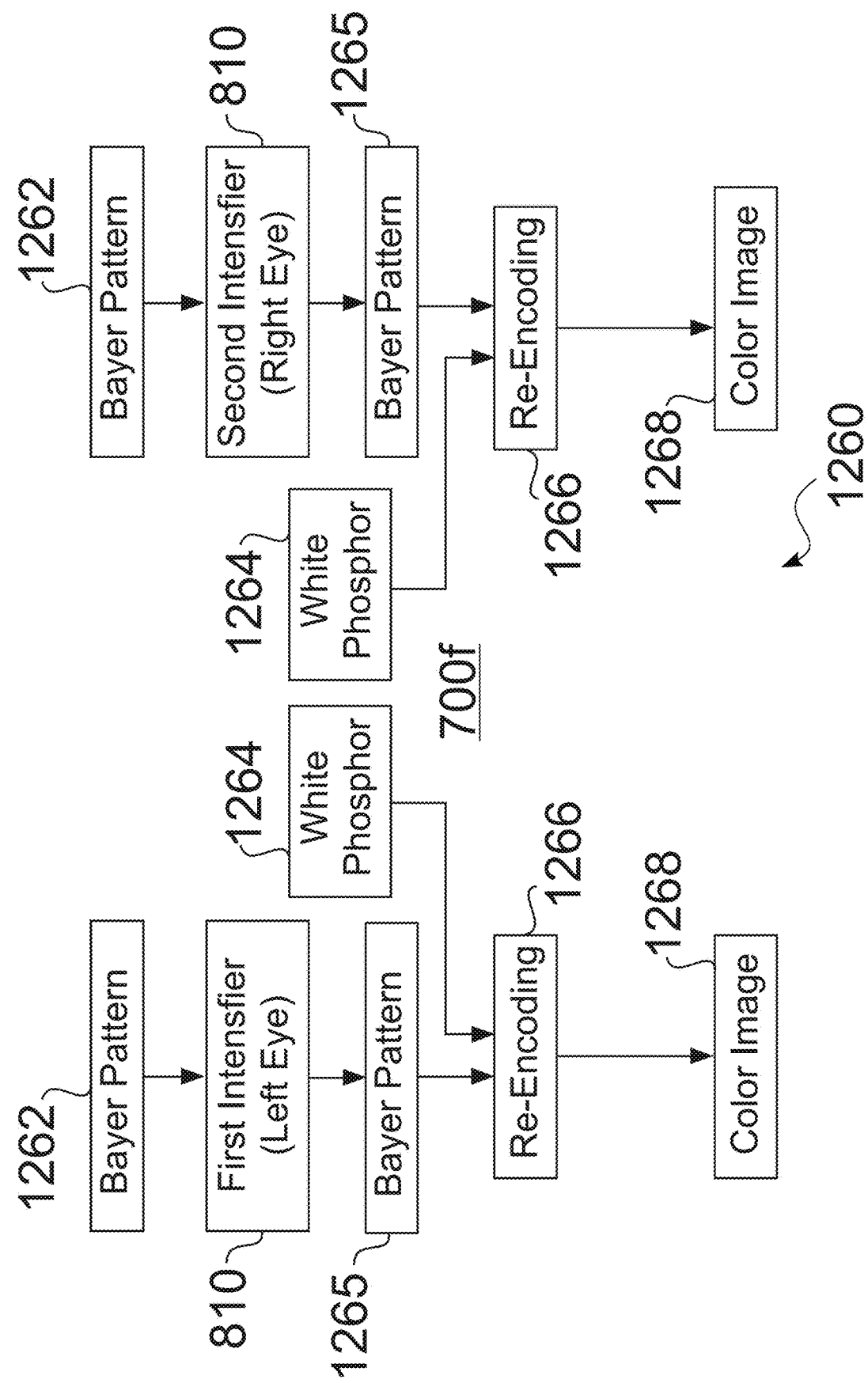
FIG. 18 shows an illustrative schematic diagram of an alternate embodiment of a color night vision system that includes two intensifier tube assemblies, which characterizes the color input by each fiber of an intensifier, enabling the system to reproduce a color image using only one intensifier per eye.

FIG. 18 shows an illustrative schematic diagram 1260 of an alternate embodiment of a color night vision system 700*f* that includes two intensifier tube assemblies 810, which characterizes the color input by each fiber of an intensifier, enabling the system 700*f* to reproduce a color image 1268 using only one intensifier 810 per eye. A Bayer pattern 1262 preserves the appropriate proportion of green to red and blue.

A Bayer pattern 1262 is placed on the input (front) end of each image intensifier 810, which filters each pixel's color to red, green or blue. A corresponding Bayer pattern 1265 on the output end of the intensifier 810 can be used to reconstitute the color pattern. When combined with a white phosphor 1264, the color information is re-encoded 1266, resulting in a color image 1268.

There are several ways to accomplish this:

In one embodiment, light from the phosphor 1264 of the device 10 is used to expose a photo resist material. This allows the generation of colored dyes exactly matching the required positions of the individual dye cells, accommodating any distortions induced by the intensifier. Simply illuminating the capturing Bayer pattern 1264 with red, green and blue light at different steps of the process allows a staged manufacturing process.

Alternately, a machine vision camera and projector assembly can be used to observe the patterns on the phosphor 1264 of the intensifier 810 that the Bayer pattern 1262 created. Light is then projected of the appropriate shape and wavelength to accommodate the photolithography process.

This information can also be used to characterize the color of each pixel input to a CCD imager, e.g., 820, which accepts the output from the intensifier 810. The imager 820 can then re-encode the color digitally.

Another method is to do away with the Bayer filter 1262 at the input end, and simply send the output image to a fiber optic bundle, which is then randomly divided into N bundles, one per color required. Each separated bundle's fibers are taken from throughout the spatial extent of the entire bundle.

The opposite, separated ends of the bundles are each imaged by CCD chips or other devices, through a color filter. For example, the fiber can be divided into three bundles, which send light through red, green and blue filters 812, for an RGB color scheme.

Since each bundle is a random and equally distributed selection of fibers, the color night vision device 10 must be trained as to which fibers correspond to which colors. For example, the device 10 can be pointed at a pure green background, and the spatial location of each subsequent green pixel recorded in the device's permanent memory. This process can then be repeated for the red and blue bundles.

This arrangement decreases fabrication costs in favor of computational and fiber costs, which are relatively inexpensive.

Yet another method addresses the fact that each filter cuts out either ⅔ of the available photons (RGB scheme) or ⅓ (CMY scheme). Furthermore, the vast majority of image detail lies in the luminance channel, with the chrominance channel adding very little information. Such an embodiment implies that most color information can be discarded, in favor of higher collection of photons for greater sensitivity, while maintaining sufficient color information for a reasonable image.

Therefore, to retain sufficient color information while retaining as much sensitivity as possible, a glass disk can be placed in the image pathway, with only a small minority of its area comprised of widely dispersed RGB or CMY color filters, while the remainder is comprised of clear glass to pass all photons. The color filters furnish sufficient color information to reconstruct the approximate locations of color in the scene, at the expense of less well-defined boundaries between colors.

This sparse color mask is duplicated on a second glass plate with an identical but mirror image of the pattern, such that the two plates can be aligned. The color resolution can be doubled at any time by rotating one of the filters such that the color elements are misaligned; therefore twice as many color filters are in the image path with a corresponding reduction in photon capture.

Systems and Methods for Noise Reduction

Noise reduction in static amplified images is a well-defined art, driven in part by the need for sensitive astronomical instruments. Since thermal and other noise is always present, one technique is to subtract a dark image (where the shutter is closed) from the normal image, thus removing much of the noise.

Figure 19:
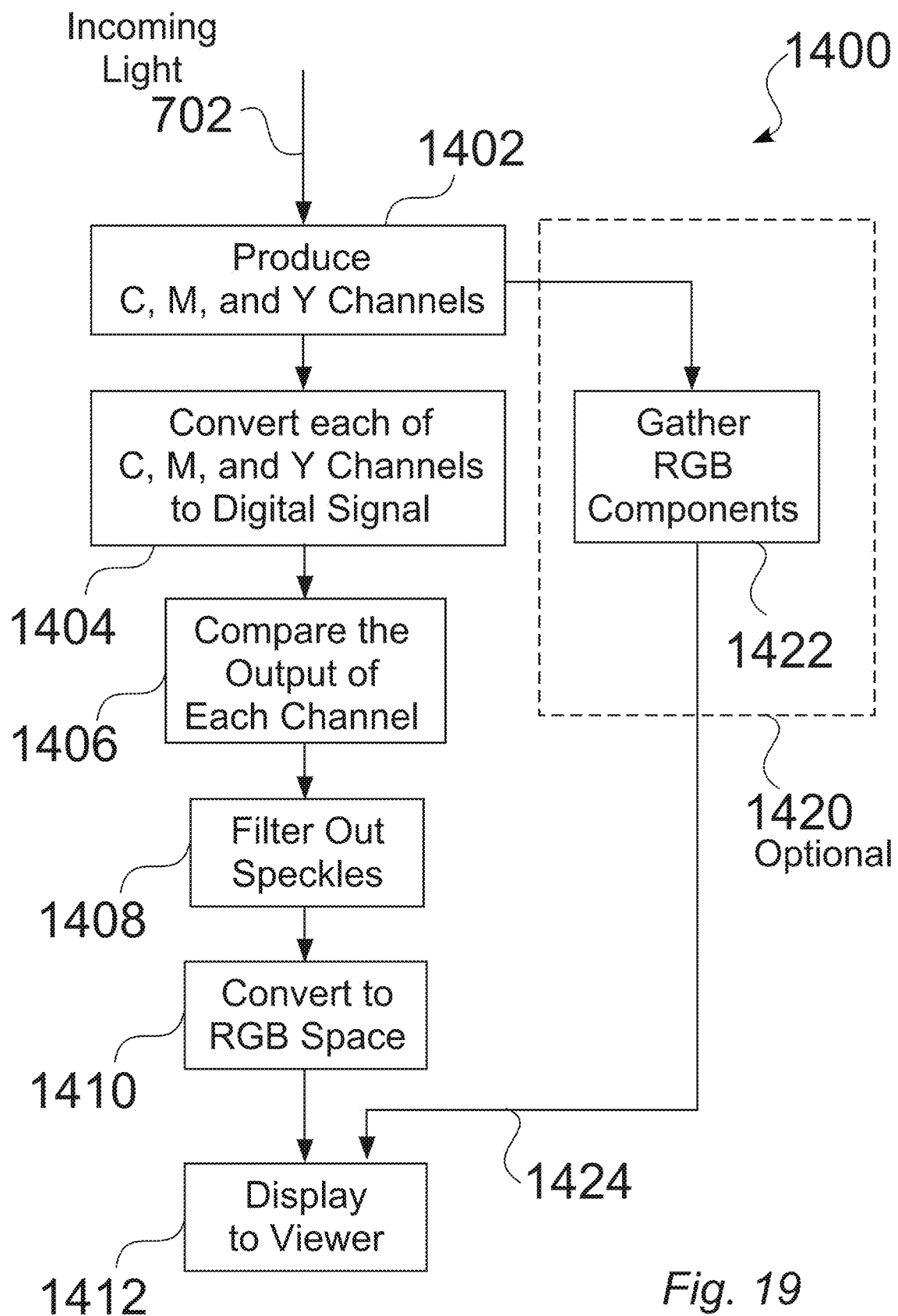
FIG. 19 is a process flowchart of an illustrative method for reducing image noise in a color night vision device, by comparing output of the color channels.

FIG. 19 is a process flowchart of an illustrative method 1400 for reducing image noise in a color night vision device 10, by comparing output of the color channels. An illustrative color night vision device 10 is constructed with a minimum of three image amplification channels 710 for monocular vision, or a second set of three channels 710 for stereo vision. Cyan, magenta, and yellow filters 812 are placed over the three channels 710. CMY is used, because, unlike RGB, the color curves overlap such that each point along the spectrum appears in at least two channels. For example, any color in the red spectrum appears in both the magenta and yellow channels and blue is covered by cyan and magenta.

The output 1402 of each channel 710 is converted 1404 to a digital signal. A processor compares 1406 the content of each channel 710. Since the CMY curves completely overlap, any actual object, even on a pixel level, must appear in two channels 710. If changes occur in only one channel 710, that is an indication of noise. These speckles are then filtered out 1408, and the output is converted 1410 to RGB space, for display 1412 to the viewer V. Although the illustrative process seen in FIG. 19 removes the bright, white-appearing speckling, some lower-intensity colored speckling still appears.

Note that this process 1400 can apply not only to color night vision devices 10, but can be implemented with any solid-state imaging device.

In some embodiments, a second set of detectors can be used to gather 1422 additional light in the form of RGB components. For example, cyan light (green and blue) is transmitted to the cyan channel 710 above, by placing a cyan dichroic filter 812 in front of an image intensifier 816, which reflects or absorbs any non-cyan light, i.e., red. Normally, this reflected light is discarded, but any additional light is welcome in a lowlight situation.

If the filter 812 is placed at an angle relative to the intensifier 816, such as at an angle of 45 degrees, the reflected light can be transmitted to an additional intensifier 816. Analogous filters are placed in front of intensifiers 816, to separate magenta and yellow, and in this way, red, green, and blue light components are gathered 1422 in the three additional intensifiers 816. These RGB components can then be combined 1424 with the CMY components for viewing 1412, either optically or on a display 760.

Figure 20:
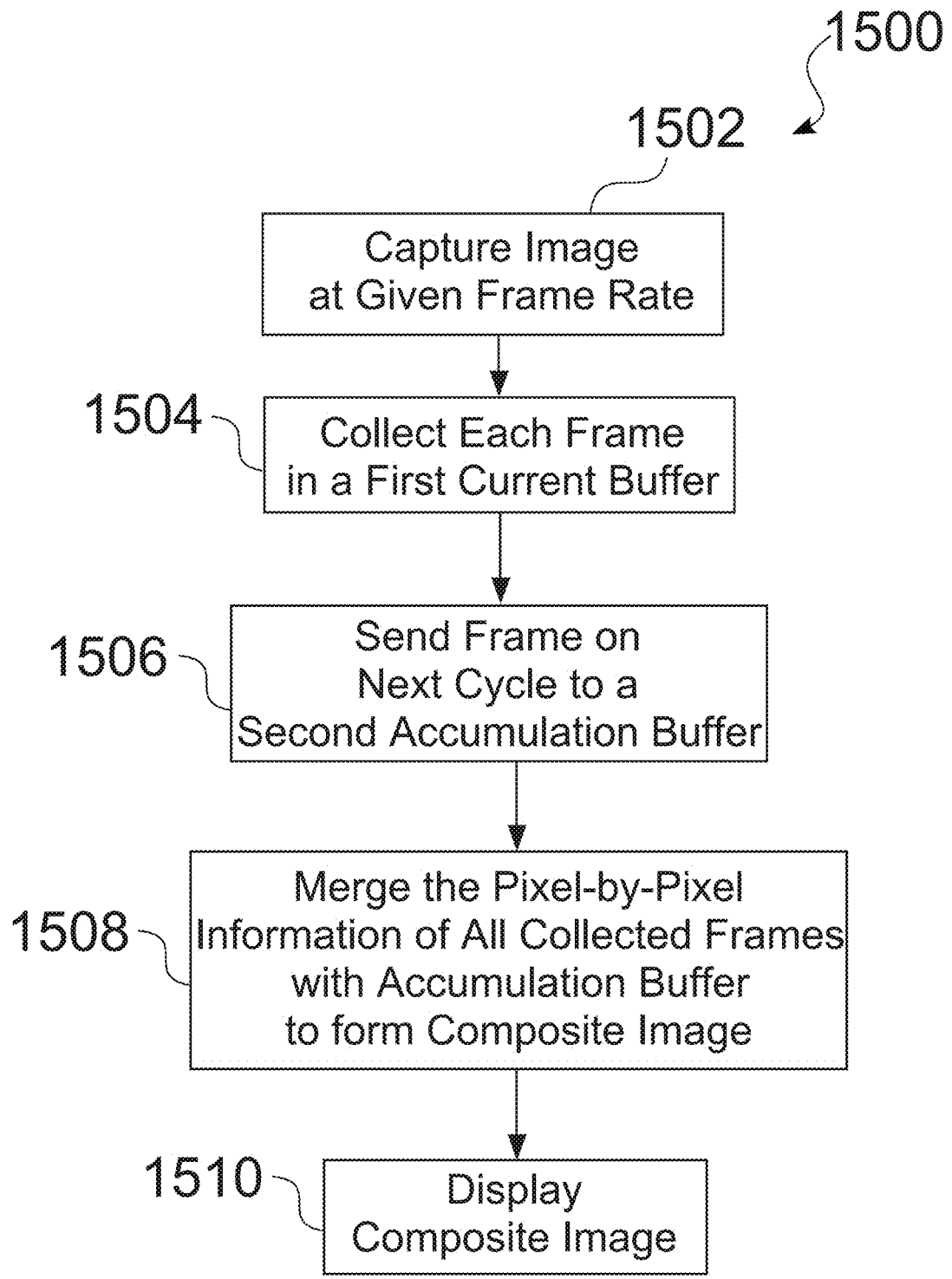
FIG. 20 is a process flowchart of an illustrative method for reducing image noise in a color night vision device, using a plurality of buffers.

FIG. 20 is a process flowchart of an illustrative method 1400 for reducing image noise in a color night vision device 10, using a plurality of buffers. In the illustrative method seen in FIG. 20, an image 702 is captured 1702 at a given frame rate, for example 30 frames per second, by an image amplification device and digital camera. The processor contains two frame buffers, "current" and "accumulation". Each frame is collected 1504 first in the current buffer, then sent 1506 on the next cycle (for example ⅓₀ second) to the accumulation buffer. The latter buffer merges 1508 the pixel-by-pixel information of all collected frames into a composite image. The resulting average reduces noise, but any moving object blurs or disappears.

The image can then be displayed 1510, wherein the image is a weighted composite of the two buffered images. The composite image is a tradeoff; as the accumulated buffer is given more weight, noise is reduced, but moving objects disappear; as the current buffer is given more weight, moving objects are seen but noise increases.

To help alleviate this tradeoff, a spatially sensitive dynamic filter can be used to weight static and moving portions of the image differently. For example, a spinning object can occupy the upper right portion of the frame. Most of the image is static, and the accumulated buffer is highly weighted. However, the upper right portion around the spinning object is weighted towards the current buffer. Thus, the static part of the image retains low noise, while the moving upper right portion can still be viewed, at the cost of increased noise in that portion only.

Such a filter can be implemented by the following steps: First, each current image is blurred, to remove high frequency information, including noise (which is pixel-sized). This is compared to a blurred image of the image in the accumulated buffer. Any difference can be interpreted as a moving object. The area around the difference is then weighted towards the current buffer. Thus, the static part of the image retains low noise, while the moving upper right portion can still be viewed, at the cost of increased noise in that portion only. These areas can be distinguished by masking filters that separate the moving and non-moving portions of the image.

Additionally, the masking filters can be further weighted by other parameters. For example, the sensitivity of the masks can vary, based on whether they are located towards the bottom or top of the image. Moving objects towards the bottom of the field of view can be assumed to be larger, while those on the top are typically smaller. Thus, a more sensitive mask may be needed to detect smaller moving areas towards the top of the field of view.

Figure 21:
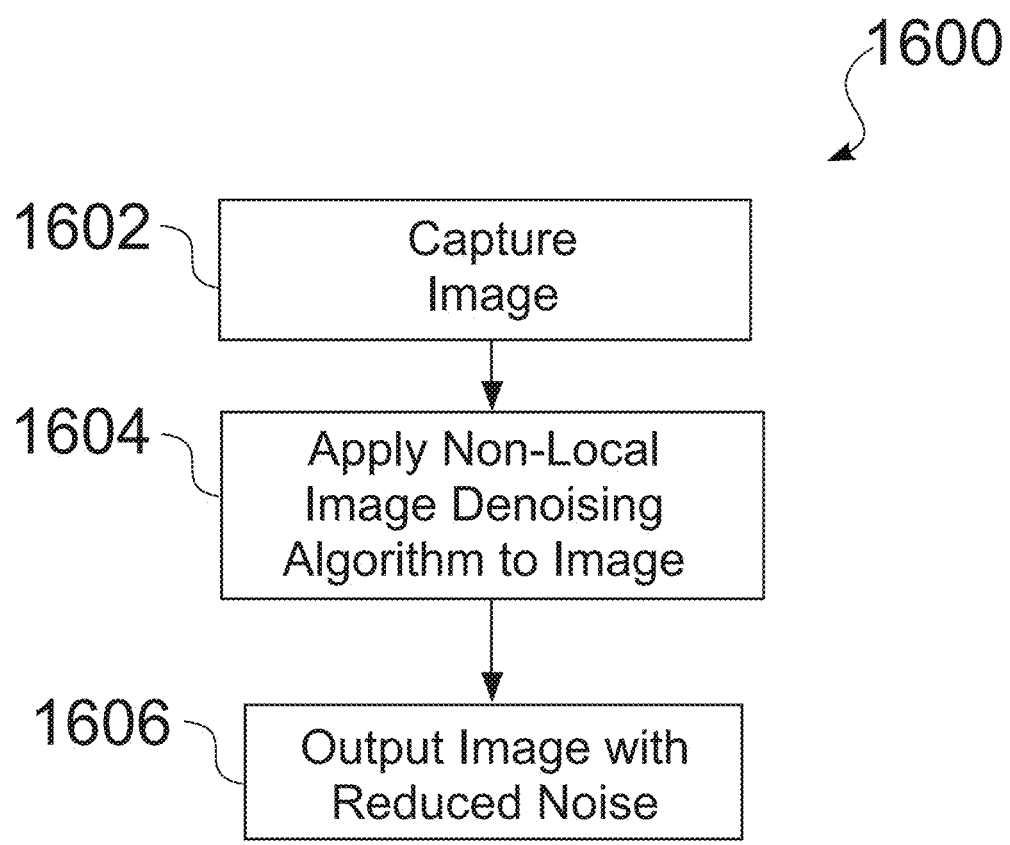
FIG. 21 is a process flowchart of an illustrative method for reducing image noise in a color night vision device, which applies a non-local image denoising algorithm to reduce the noise.

FIG. 21 is a process flowchart of an illustrative method 1600 for reducing image noise in a color night vision device 10, which applies 1604 a non-local image denoising algorithm to reduce the noise. In some embodiments, the applied 1604 algorithm is described by A. Buades et al., "A non-local algorithm for image denoising", Proc. IEEE CVPR, vol. 2, pp. 60-65,2005. In some embodiments, the noise reduction is performed using an "accelerated" variation of the algorithm described by Wang, Jin et al., "Fast non-local algorithm for image denoising" Image Processing, 2006 IEEE International Conference on, pp. 1429-1432. In some embodiments, the algorithm is extended or enhanced to capitalize on the CMY structure of the incoming 1602 image data.

Spatial or Temporal Integration for Improved Color Night Vision.

The color night vision system 700 increases the sensitivity of a color night vision system by integrating one or more color channels 710 in the spatial and or temporal dimensions. This increases the overall brightness of the available image, at the possible expense of reduced resolution due to motion artifacts or spatial limitations of the imaging system.

By comparing the images in different color channels 710, the color night vision system 700 preferably modulates the amount of color information available after spatial and/or temporal integration has taken place. For example, the blue channel 710b can be captured at a relatively low frame rate (and a correspondingly longer integration time). The resultant composite image can therefore have more blur in the blue channel 710b. In some embodiments, this blue signal can be added as a brightness value to all channels, with a resultant loss of saturation. As the data in the blue image becomes richer with information, it can contribute more color data.

CMY-Filtered Field Sequential Color Night Vision for Improved Brightness.

An existing type of color night vision device rotates a disk of red, green, and blue color filters in front of a standard night vision scope. The difference in intensity produced by differently colored objects is interpreted as color by the user.

Alternatively, a corresponding, matching disk of rapidly rotating output filters can output color fields in sequence, with the combined image is a color representation.

Figure 24:
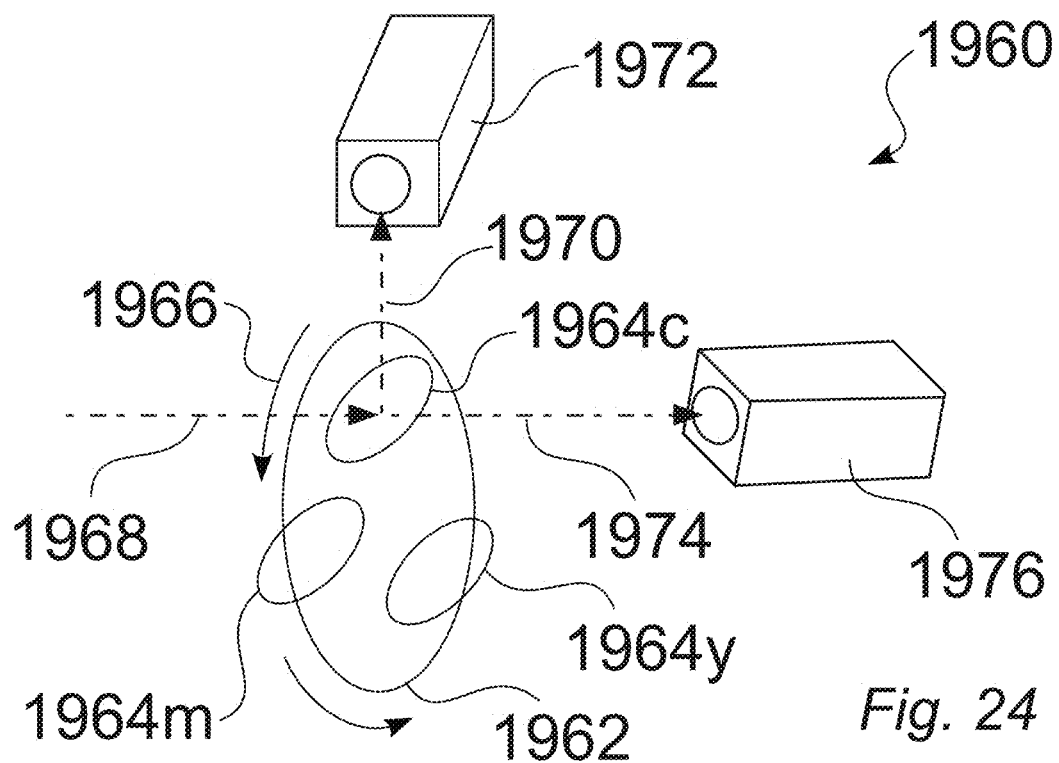
FIG. 24 is a simplified schematic diagram of an illustrative embodiment of a system for CMY-filtered sequential color night vision.
Figure 25:
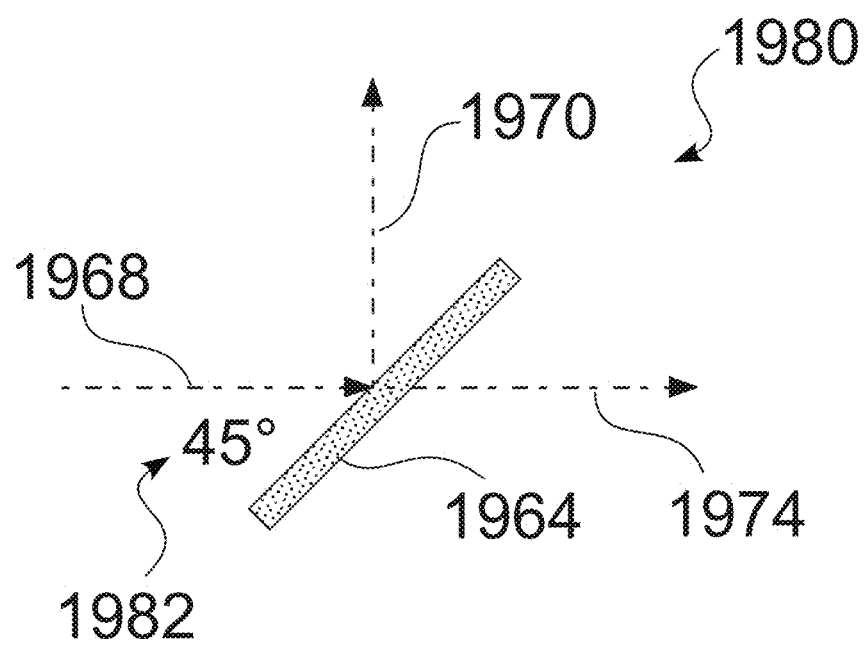
FIG. 25 is a detailed view of light transmitted through an inclined filter.
Figure 26:
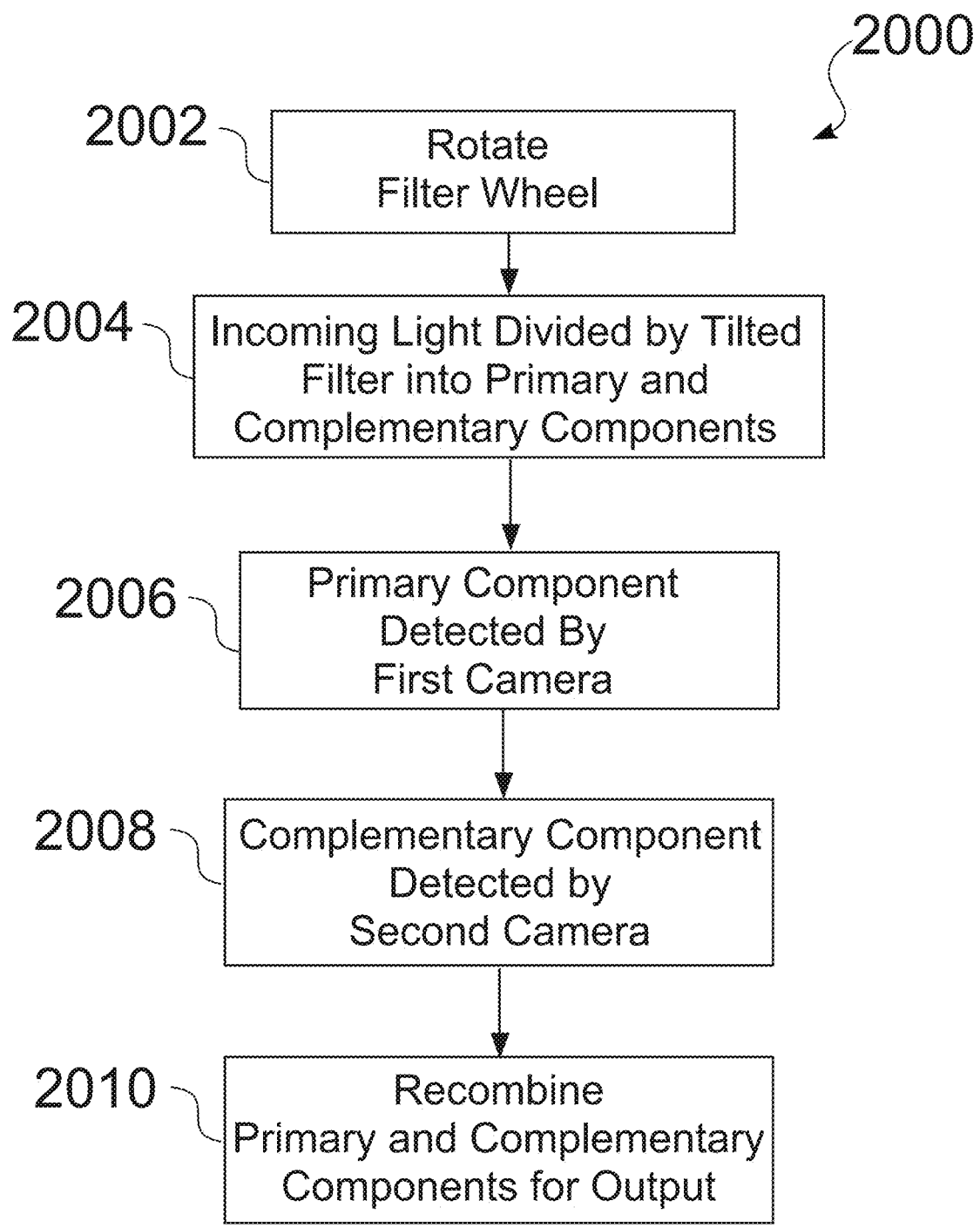
FIG. 26 is a flowchart of an illustrative method for CMY-filtered sequential color night vision.

FIG. 24 is a simplified schematic diagram 1960 of an illustrative embodiment of a system for CMY-Filtered sequential color night vision. FIG. 25 is a detailed view 1980 of light transmitted through an inclined filter 1964. FIG. 26 is a flowchart of an illustrative method 2000 for CMY-filtered sequential color night vision.

In essence, this method 2000 scans colors over time. However, each color filter 1964 dramatically reduces the number of photons captured, e.g., brightness, since photons not of that color are excluded. Further, RGB filters have a narrow pass range, further cutting back on photons captured.

To improve light gathering for such a rotating filter type of device, Cyan-Magenta-Yellow (CMY) filters 1964, e.g., 1964c, 1964m, 1964y, are fitted to a rotating disk 1962. CMY filters each cover about ⅔ of the spectrum, vs. ⅓ for conventional RGB filters. This effectively doubles the number of photons passed through each filter.

To capture even more photons, each filter 1964 is tilted 1982 at 45 degrees with respect to the incoming light 1968, with its interference layers being suitably compressed to continue the pass the appropriate frequencies. While light of the appropriate frequency range 1974 continues to be passed through the filter as above, the rejected photons 1970 (R for C, G for M, and B for Y) are reflected from the filter, and are captured by a sensor. The rejected photons are then recombined with the passed light, using a similar arrangement on the viewing side. This furnishes the maximum possible brightness and sensitivity in a non-direct view embodiment.

Motion Compensation for Temporal Scanning Color Night Vision.

Another issue with a conventional rotating/temporal scanning filter type of night vision device, as discussed above, is that if the device is not stationary, relative to the target, such as a device used on a vehicle or aircraft, color smearing can occur, as each filtered image is viewed in a slightly different location than the last.

Figure 27:
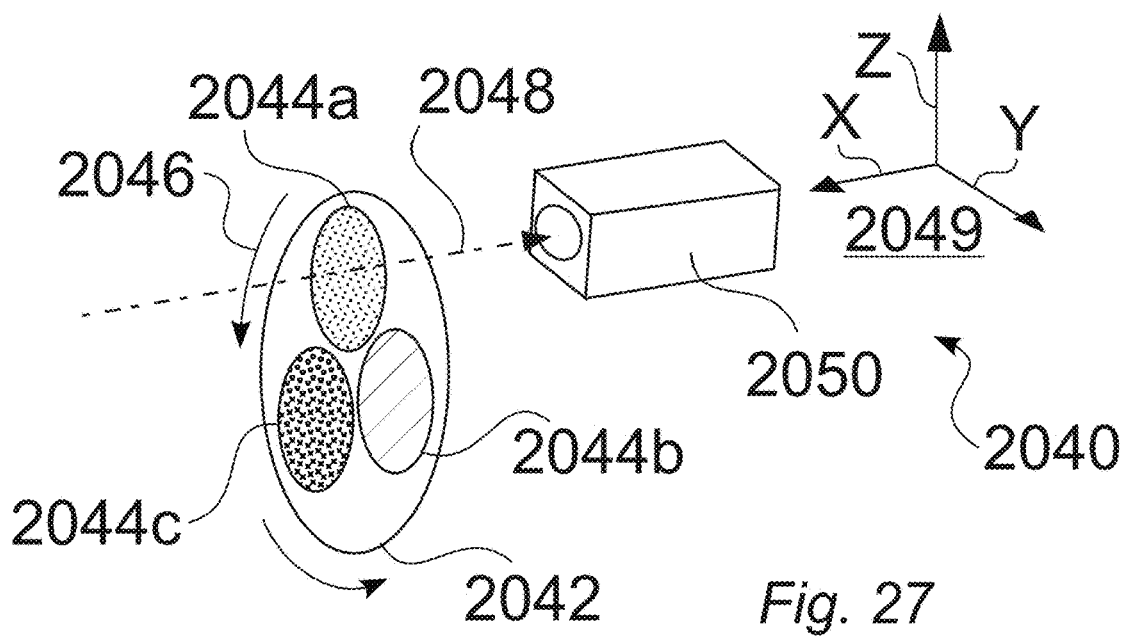
FIG. 27 is a simplified schematic diagram of motion compensation for temporal scanning color night vision.
Figure 28:
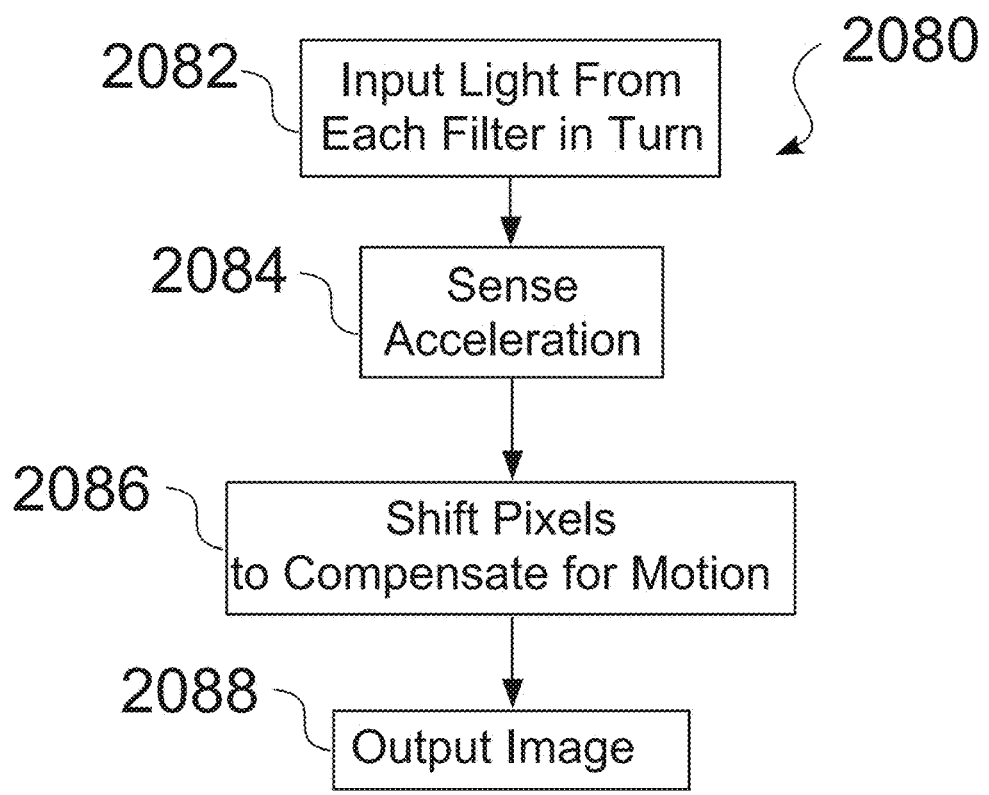
FIG. 28 is a flowchart of an illustrative method for motion compensation for temporal scanning color night vision.

To counter this, some embodiments of the color night vision device 10 can be fitted with rotating optical filters, or electronic temporal scanning, to generate color images. FIG. 27 is a simplified schematic diagram 2040 of motion compensation for temporal scanning color night vision. FIG. 28 is a flowchart of an illustrative method 2080 for motion compensation for temporal scanning color night vision.

In some embodiments 10, the mechanism for encoding the information can be a motorized filter wheel, or a switched liquid crystal device. By viewing a white phosphor viewing screen on the rear of the color night vision device 10, through a similar mechanism, this color information is presented, such as directly to the human eye, or to spatially encoded color sensors.

Using the known characteristics of the optics of the color night vision device 10, a rotational sensor and accelerometers on the camera 10 can track the camera's motion 2049, while a compensating algorithm can shift each of the resulting three separately colored images to maintain alignment. However, this technique cannot compensate for situations where the viewed object itself is moving.

Circular Filter Variable Between Color Purity and Brightness

Color night vision systems are typically not adjustable to trade off color information versus sensitivity. This can be a useful feature, such as in especially low-light situations, where color is less important than gathering the maximum number of pixels.

Figure 22:
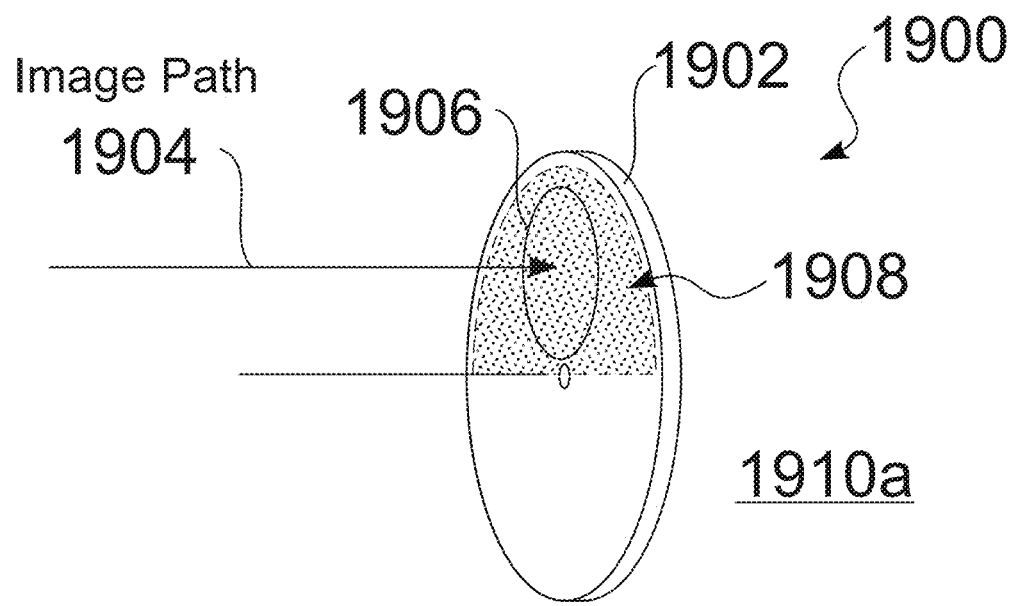
FIG. 22 is a schematic view of a circular filter disk for a color night vision camera, wherein the filter disk is in a first position, and can be rotated in an image path, to vary the effectiveness of the color filter.
Figure 23:
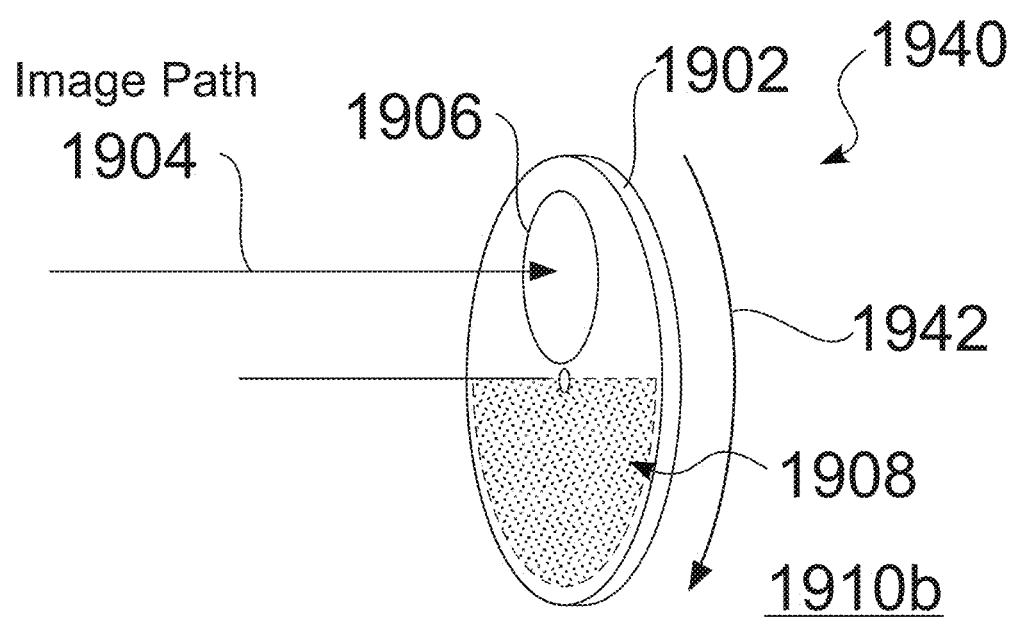
FIG. 23 is a schematic view a circular filter disk for a color night vision camera, wherein the filter disk is in a second position, and has been rotated to a second position, to vary the effectiveness of the color filter.

FIG. 22 is a schematic view 1900 of a circular filter disk 1902 for a color night vision camera 10, wherein the filter disk 1902 is in a first position 1910a, and can be rotated 1942 (FIG. 23) in an image path 1904, to vary the effectiveness of the color filter 1908. FIG. 23 is a schematic view 1940 a circular filter disk 1902 for a color night vision camera 10, wherein the filter disk 1902 is in a second position 1910b, and has been rotated 1942 to a second position 1910b, to vary the effectiveness of the color filter 1908.

The circular filter region 1906 sees only a portion of the disc 1902, to vary the effectiveness of the color filter 1902. For example, the disk 1902 can be constructed with a cyan filter 1908 that, in a first position 1910a, is 100% effective in a particular radial direction, rejecting all red light. As the disk 1902 is rotated 1942 about its center, the cyan filter 1908 passes more red light, until a point at which no photons are rejected. Thus the effectiveness of the filter 1902 can be infinitely variable, between color purity and maximum brightness.

Complementary filters are used in the image path for other colors, either CMY or RGB. Alternatively, the disc can be used to vary blockage of infrared light.

In practice, the effect can be achieved by producing the filter in a checkerboard pattern with blocks alternating between filter blocks and clear pass blocks, e.g., a variable density dichroic color separator. At the first position, the filter blocks fill the entire area presented to the image path; as the disc is rotated, the filter blocks become smaller while the clear pass blocks become larger, until the entire area in the image path is clear.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. An imaging device comprising:
    at least one separating mechanism configured to be operable to receive an image and separate at least a first spectral band range and a second spectral band range from the received image;
    a filtering channel that filters the first spectral band range separated from the received image;
    a non-filtering channel that passes the second spectral band range separated from the received image, unfiltered;
    a recombining mechanism for recombining the filtered and un-filtered spectral band ranges, wherein the recombining mechanism includes:
    a spectral band characterized pixel sensor array configured to receive the filtered and unfiltered spectral bands, and
    an image processor, coupled to the characterized pixel sensor array, programmed to convert signals received from the pixel sensor array for display, by reencoding the received signals to corrected color space values based on a set of predetermined formulas which define an association between the received pixel sensor array signals and display color values;
    and,
    a display screen for displaying the corrected color space values as color image output.

2. The imaging device of claim 1, wherein the filtering channel comprises a rotatable optical filter disk, wherein the rotatable optical filter disk further comprises a housing element which houses at least three-color component filters, and each of the color component filters has an angled configuration with respect to the housing element.

3. The imaging device of claim 2, wherein the rotatable optical filter disk comprises cyan-magenta-yellow (CMY) filters.

4. The imaging device of claim 2, wherein the rotatable optical filter disk comprises a tilted arrangement with respect to an incoming light path to the rotatable optical filter disk.

5. The imaging device of claim 2, further comprising a light sensor arranged to capture rejected photons that are reflected from the rotatable optical filter disk.

6. The imaging device of claim 1, wherein the spectral band characterized pixel sensor array is characterized by a Bayer pattern filter.

7. The imaging device of claim 6, wherein the recombining mechanism further comprises:
a white phosphor; and
a photoresist material, wherein light from the white phosphor exposes the photoresist material.

8. The imaging device of claim 1, wherein the spectral band characterized pixel sensor array includes a CCD imager for re-encoding color data digitally.

9. The imaging device of claim 1, wherein the recombining mechanism further comprises the image processor programmed to access and utilize a gamma-correction look-up table.

10. The imaging device of claim 1, further comprising one or more accelerometers, wherein the one or more accelerometers track motion of the imaging device; and
an image processor programmed to utilize accelerometer output to shift pixel sensor array signals, wherein the corrected color space values are shifted according to accelerometer output.

11. An optical processing method comprising the steps of:
receiving an incoming image signal and separating at least a first spectral band range and a second spectral band range from the received image, via a separation mechanism;
filtering the first spectral band range, via a filter element, wherein the first spectral band is passed to a recombining mechanism after being filtered;
passing the second spectral band range to the recombining mechanism, unfiltered, via a non-filtering channel;
recombining the filtered and un-filtered spectral band ranges, via the recombining mechanism, wherein the recombining includes:
characterizing a pixel sensor array to receive the filtered and unfiltered spectral bands, and
converting, via an image processor, signals received from the pixel sensor array, by reencoding the received signals to corrected color space values based on a set of predetermined formulas which define an association between the received pixel sensor array signals and display color values; and,
displaying, via a display screen, the corrected color space values as color image output.

12. The optical processing method of claim 11, further comprising the step of:
rotating the filter element, wherein the filter element has a housing that is rotated by actuation of a motor.

13. The optical processing method of claim 11, further comprising the step of:
characterizing the color of each pixel input to a pixel sensor array using a Bayer pattern filter, a white phosphor, and a photoresist material, wherein Bayer pattern filtered light exposes the photoresist material through the white phosphor.

14. The optical processing method of claim 11, further comprising the step of:
detecting, via a light sensor, reflected light components from the filtering element.

15. The optical processing method of claim 14, further comprising the steps of:
combining the detected reflected light components with the corrected color space values; and
providing the combination as output for viewing.

16. The optical processing method of claim 11, further comprising the steps of:
detecting, via a light sensor, reflected light components from the filtering element;
sensing motion of the imaging device, via one or more accelerometers;
shifting pixel sensor array signals, wherein the reencoding of the received signals includes shifting corrected color space values according to the sensed motion;
combining the detected reflected light components with the shifted corrected color space values; and
providing the combination as output for viewing.

17. The optical processing method of claim 11, wherein the step of recombining the filtered and un-filtered spectral band ranges further comprises:
gamma-correcting, via look-up table, signals received from the pixel sensor array, before reencoding the received signals to corrected color space values.

\* \* \* \* \*